US012117764B2

(12) United States Patent
Kimura et al.

(10) Patent No.: US 12,117,764 B2
(45) Date of Patent: Oct. 15, 2024

(54) TONER CARTRIDGE

(71) Applicant: CANON KABUSHIKI KAISHA, Tokyo (JP)

(72) Inventors: Takashi Kimura, Tokyo (JP); Go Torii, Kanagawa (JP); Yasuyuki Egami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/210,147

(22) Filed: Jun. 15, 2023

(65) Prior Publication Data

US 2023/0418214 A1 Dec. 28, 2023

(30) Foreign Application Priority Data

Jun. 24, 2022 (JP) ................................ 2022-102276

(51) Int. Cl.
*G03G 15/08* (2006.01)
*G03G 21/12* (2006.01)
(Continued)

(52) U.S. Cl.
CPC ..... *G03G 21/1814* (2013.01); *G03G 15/0862* (2013.01); *G03G 15/0865* (2013.01);
(Continued)

(58) Field of Classification Search
CPC ........... G03G 15/0808; G03G 15/0822; G03G 15/0862; G03G 15/0865; G03G 15/0875;
(Continued)

(56) References Cited

U.S. PATENT DOCUMENTS 6,081,676 A 6/2000 Inomata
8,983,358 B2 3/2015 Ota
(Continued)

FOREIGN PATENT DOCUMENTS

JP 2001-056607 A 2/2001
JP 2013-205612 A 10/2013
(Continued)

OTHER PUBLICATIONS

Oct. 24, 2023 Extended Search Report in European Patent Application No. 23 180 266.1.
(Continued)

*Primary Examiner* — Sophia S Chen
(74) *Attorney, Agent, or Firm* — Venable LLP

(57) ABSTRACT

A toner cartridge includes a toner accommodating unit including first and second accommodating portions and includes a light transmitting portion having an incident surface and an emergent surface. The toner accommodating unit includes first and second end portions with respect to a first direction and includes third and fourth end portions with respect to a second direction crossing the first direction. The first accommodating portion is provided with a discharge opening, and the second accommodating portion is provided with a receiving opening. The discharge opening and the receiving opening are positioned closer to the third end portion than to the fourth end portion in the second direction. The incident surface and the emergent surface are provided in positions closer to the fourth end portion than to the third end portion in the second direction and are exposed to an outside of the cartridge.

14 Claims, 19 Drawing Sheets

(51) Int. Cl.
*G03G 21/16* (2006.01)
*G03G 21/18* (2006.01)

(52) U.S. Cl.
CPC ..... *G03G 15/0881* (2013.01); *G03G 15/0896* (2013.01); *G03G 21/12* (2013.01); *G03G 21/1633* (2013.01); *G03G 21/1676* (2013.01)

(58) Field of Classification Search
CPC ........... G03G 15/0881; G03G 15/0886; G03G 15/0896; G03G 15/0898; G03G 21/12; G03G 21/1633; G03G 21/1676; G03G 21/1814
See application file for complete search history.

(56) References Cited

U.S. PATENT DOCUMENTS

| | | | | |
|---|---|---|---|---|
| 9,465,318 | B2 | 10/2016 | Takeuchi et al. | |
| 9,523,942 | B2 | 12/2016 | Takeuchi et al. | |
| 9,625,855 | B2 | 4/2017 | Ota | |
| 9,836,016 | B2 | 12/2017 | Kawakmai et al. | |
| 9,989,892 | B2 | 6/2018 | Takeuchi et al. | |
| 10,037,000 | B2 | 7/2018 | Torii et al. | |
| 10,613,453 | B2 | 4/2020 | Kimura et al. | |
| 10,705,481 | B2 | 7/2020 | Sugimoto et al. | |
| 10,747,144 | B2 | 8/2020 | Kimura et al. | |
| 10,761,472 | B2 | 9/2020 | Kashiide et al. | |
| 10,884,356 | B2 | 1/2021 | Kimura et al. | |
| 11,022,934 | B2 | 6/2021 | Kashiide et al. | |
| 11,048,207 | B2 | 6/2021 | Kimura et al. | |
| 11,256,209 | B2 | 2/2022 | Kimura et al. | |
| 11,360,408 | B2 | 6/2022 | Kimura et al. | |
| 11,366,409 | B2 | 6/2022 | Kimura et al. | |
| 11,392,082 | B2 | 7/2022 | Nishida et al. | |
| 11,506,993 | B2 | 11/2022 | Kimura et al. | |
| 11,609,530 | B2 | 3/2023 | Kashiide et al. | |
| 11,650,536 | B2 | 5/2023 | Kashiide et al. | |
| 11,669,044 | B2 | 6/2023 | Kimura et al. | |
| 11,703,793 | B2 | 7/2023 | Kashiide et al. | |
| 11,709,453 | B2 | 7/2023 | Kashiide et al. | |
| 11,714,374 | B2 | 8/2023 | Kashiide et al. | |
| 2005/0089338 | A1* | 4/2005 | Hoshi ................ | G03G 15/0862 399/27 |
| 2012/0230730 | A1 | 9/2012 | Ogino | |
| 2013/0259495 | A1 | 10/2013 | Ota | |
| 2016/0216638 | A1 | 7/2016 | Ota | |
| 2020/0341423 | A1* | 10/2020 | Kawakami ......... | G03G 15/0865 |
| 2021/0397122 | A1 | 12/2021 | Fukui et al. | |
| 2022/0050417 | A1 | 2/2022 | Nishida et al. | |
| 2023/0176496 | A1 | 6/2023 | Fujino et al. | |
| 2023/0205128 | A1 | 6/2023 | Sugimoto et al. | |
| 2023/0205129 | A1 | 6/2023 | Suetsugu et al. | |
| 2023/0221677 | A1 | 6/2023 | Kashiide et al. | |

FOREIGN PATENT DOCUMENTS

| | | | |
|---|---|---|---|
| JP | 2016-133753 | A | 7/2016 |
| JP | 2020-148998 | A | 9/2020 |
| JP | 2021-162764 | A | 10/2021 |

OTHER PUBLICATIONS

Co-pending U.S. Appl. No. 18/204,420, filed Jun. 1, 2023.
Co-pending U.S. Appl. No. 18/208,405, filed Jun. 12, 2023.

* cited by examiner (a)

(b)

(a)

(b)

(a)

(b)

TONER CARTRIDGE

FIELD OF THE INVENTION AND RELATED ART

The present invention relates to a toner cartridge.

Conventionally, a constitution in which a toner cartridge in which toner is accommodated is detachably mountable to an apparatus main assembly of an image forming apparatus has been known. As such a toner cartridge, a constitution in which a toner supply unit accommodating toner for being supplied to an image forming portion in the apparatus main assembly and a residual toner accommodating unit accommodating residual toner collected from the image forming portion are provided has been proposed (Japanese Laid-Open Patent Application Nos. 2021-162764 and 2020-148998).

SUMMARY OF THE INVENTION

According to an aspect of the present invention, there is provided a toner cartridge comprising: a toner accommodating unit including a first accommodating portion and a second accommodating portion and configured to accommodate toner, wherein the toner accommodating unit includes a first end portion and a second end portion on a side opposite from the first end portion with respect to a first direction and includes a third end portion and a fourth end portion on a side opposite from the third end portion with respect to a second direction crossing the first direction, wherein the first accommodating portion is on a side closer to the first end portion than to the second end portion in the first direction and the second accommodating portion is on a side closer to the second end portion than to the first end portion in the first direction, wherein the first accommodating portion is provided with a discharge opening for permitting discharge of the toner, accommodated in the first accommodating portion, to an outside of the toner cartridge, the discharge opening being in a position closer to the third end portion than to the fourth end portion in the second direction, and wherein the second accommodating portion is provided with a receiving opening for receiving the toner from the outside of the toner cartridge to the second accommodating portion, the receiving opening being positioned closer to the third end portion than to the fourth end portion in the second direction; and a light transmitting portion having an incident surface and an emergent surface, wherein the incident surface is configured so that light is capable of being incident from the outside of the toner cartridge into an inside of the second accommodating portion, wherein the emergent surface is configured so that the light incident into the inside of the second accommodating portion through the incident surface is capable of emerging to the outside of the toner cartridge, and wherein the incident surface and the emergent surface are provided in positions closer to the fourth end portion than to the third end portion in the second direction and are exposed to the outside of the cartridge.

Further features of the present invention will become apparent from the following description of exemplary embodiments with reference to the attached drawings.

Figure 6:
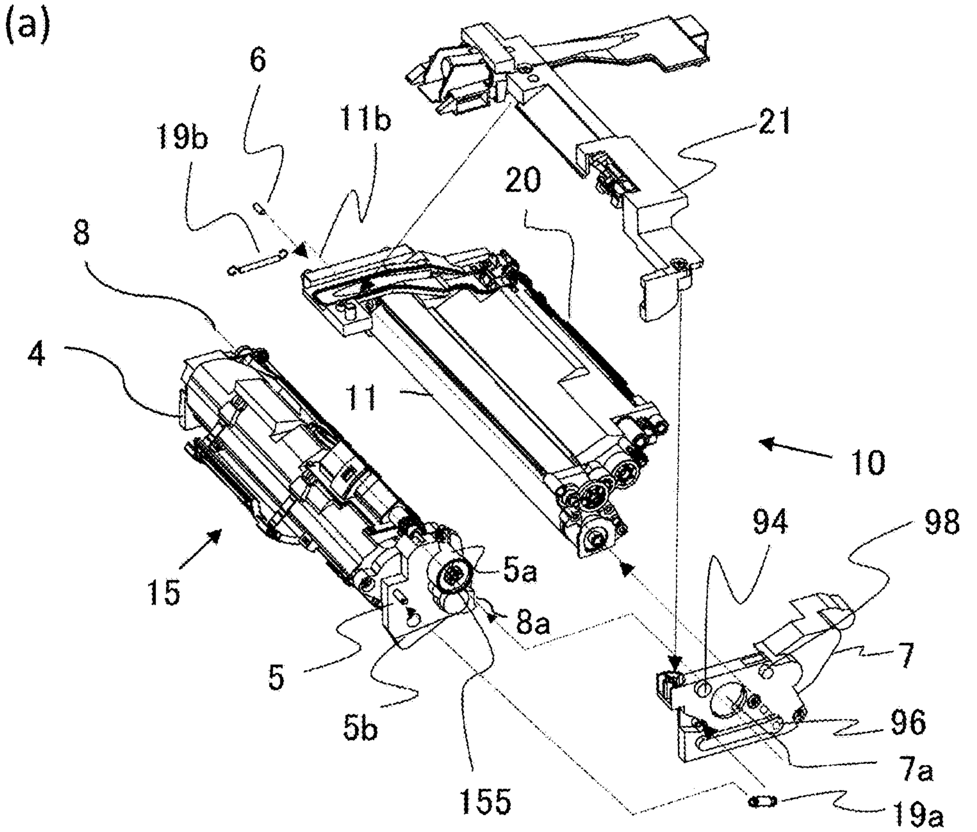
Figure 6:
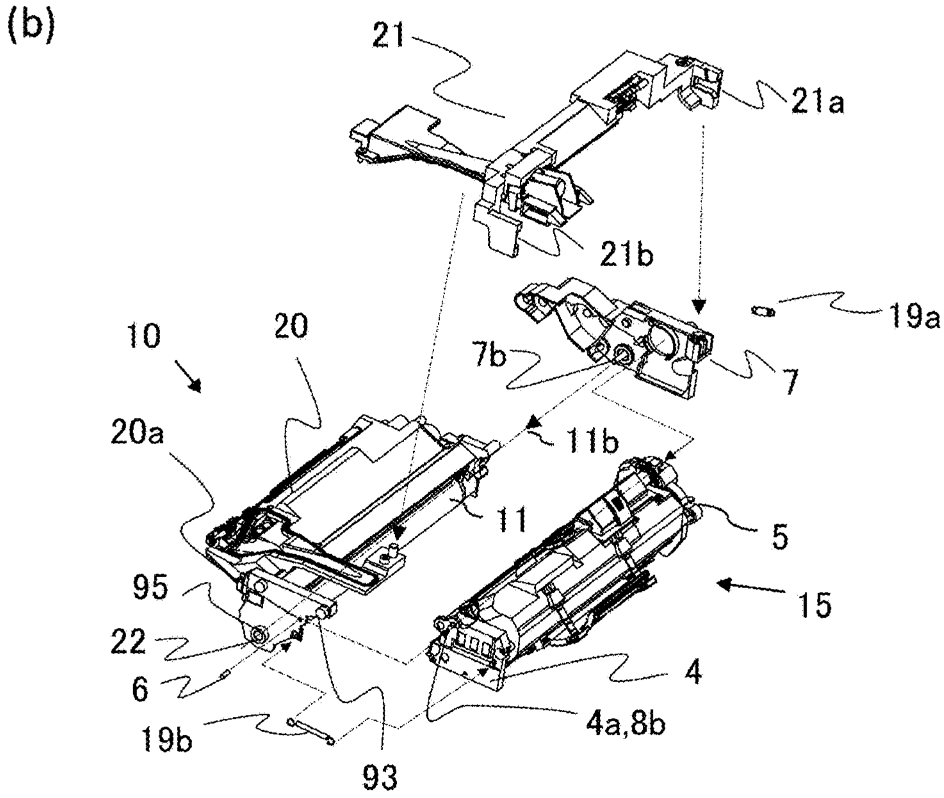

Parts (a) and (b) of FIG. 6 are exploded perspective views of the process cartridge B as viewed in different directions.

Figure 7:
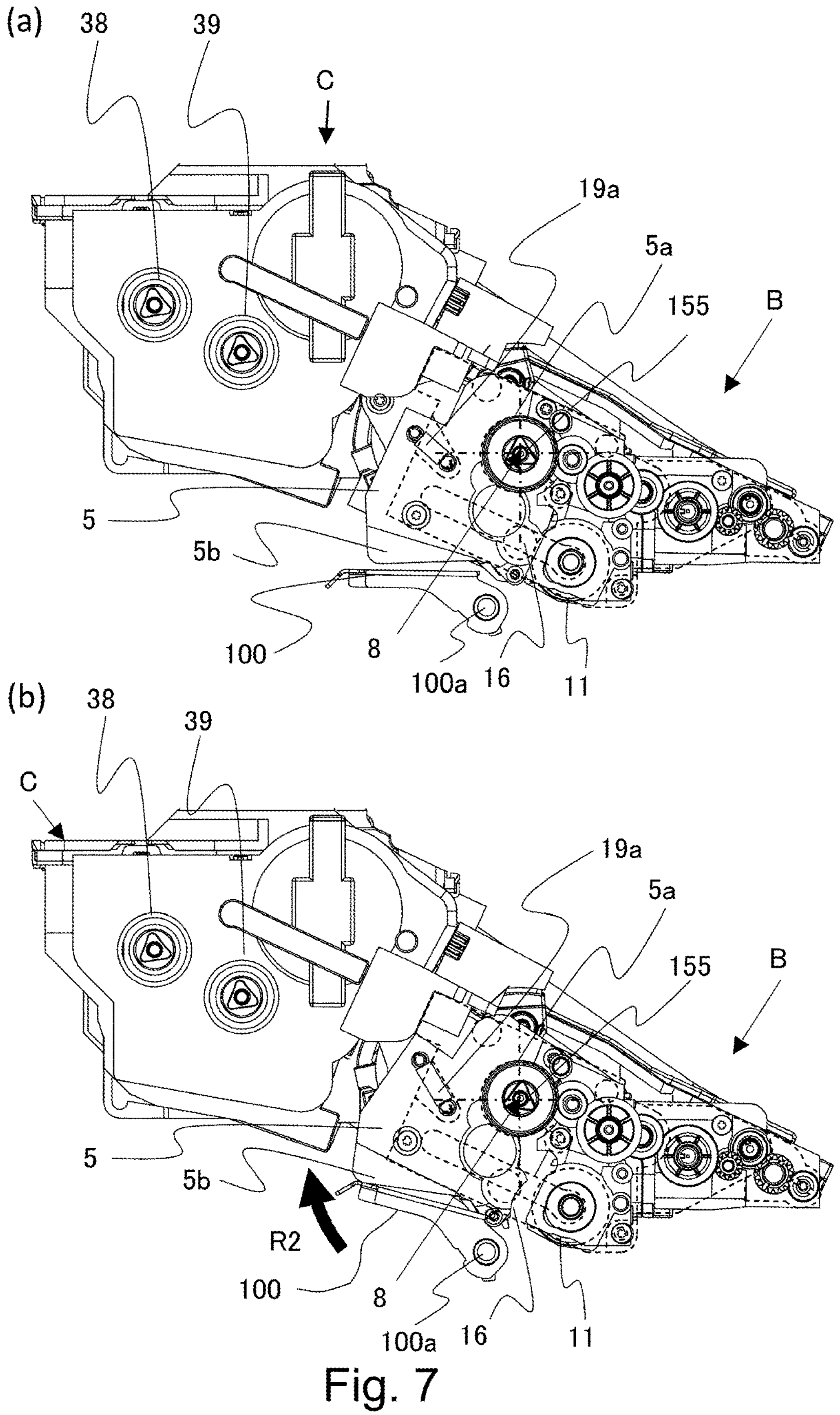

Parts (a) and (b) of FIG. 7 are side views of the process cartridge B, showing a contact state of a developing unit with a photosensitive drum and a separation state of the developing unit from the photosensitive drum.

Figure 8:
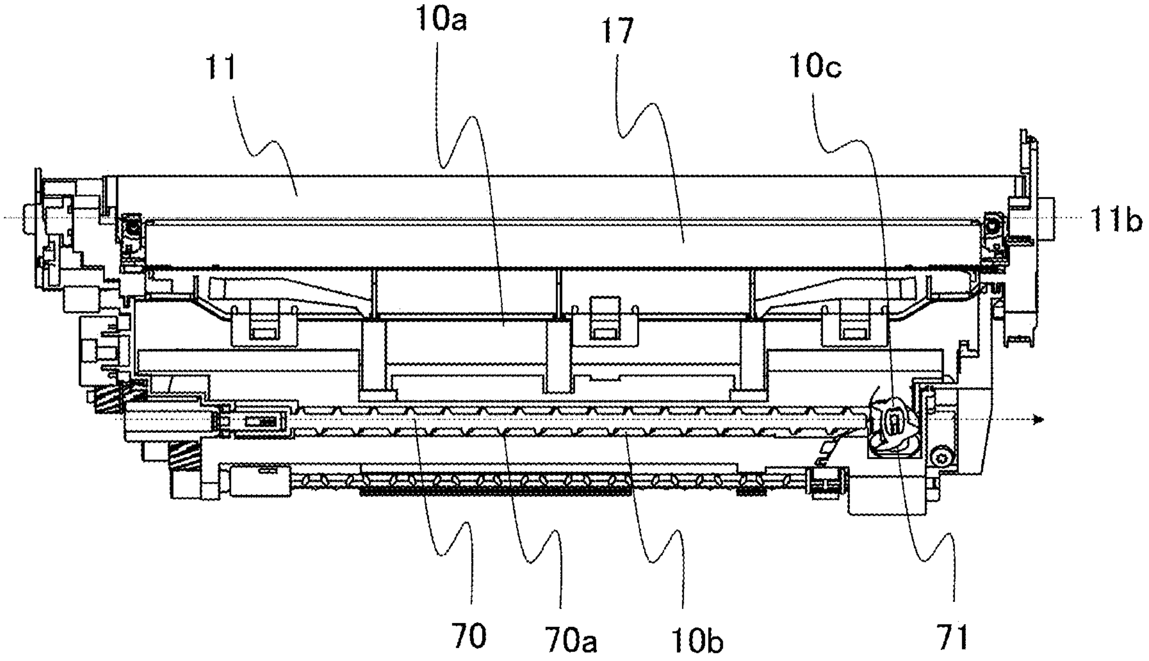

FIG. 8 is a sectional view of a toner cartridge according to the embodiment.

Figure 9:
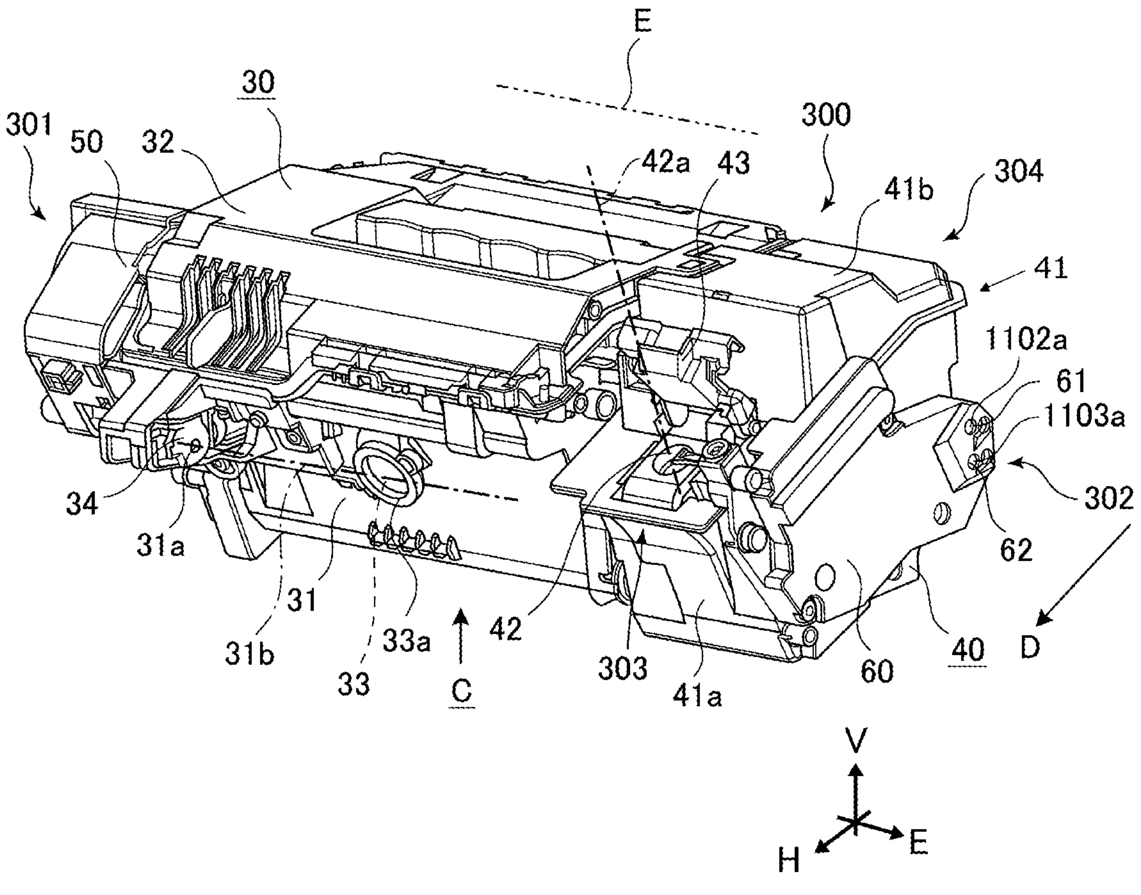

FIG. 9 is a perspective view of the toner cartridge according to the embodiment.

Figure 10:
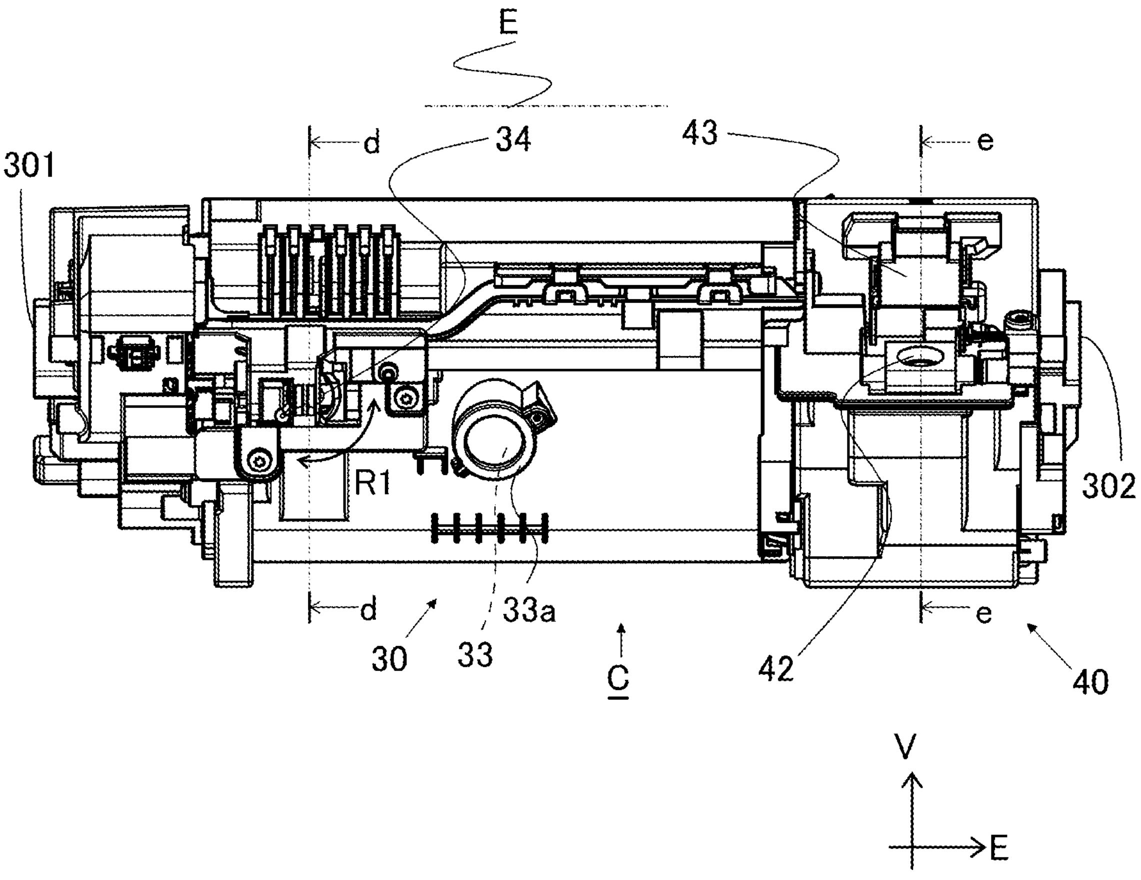

FIG. 10 is a front view of the toner cartridge according to the embodiment.

Figure 11:
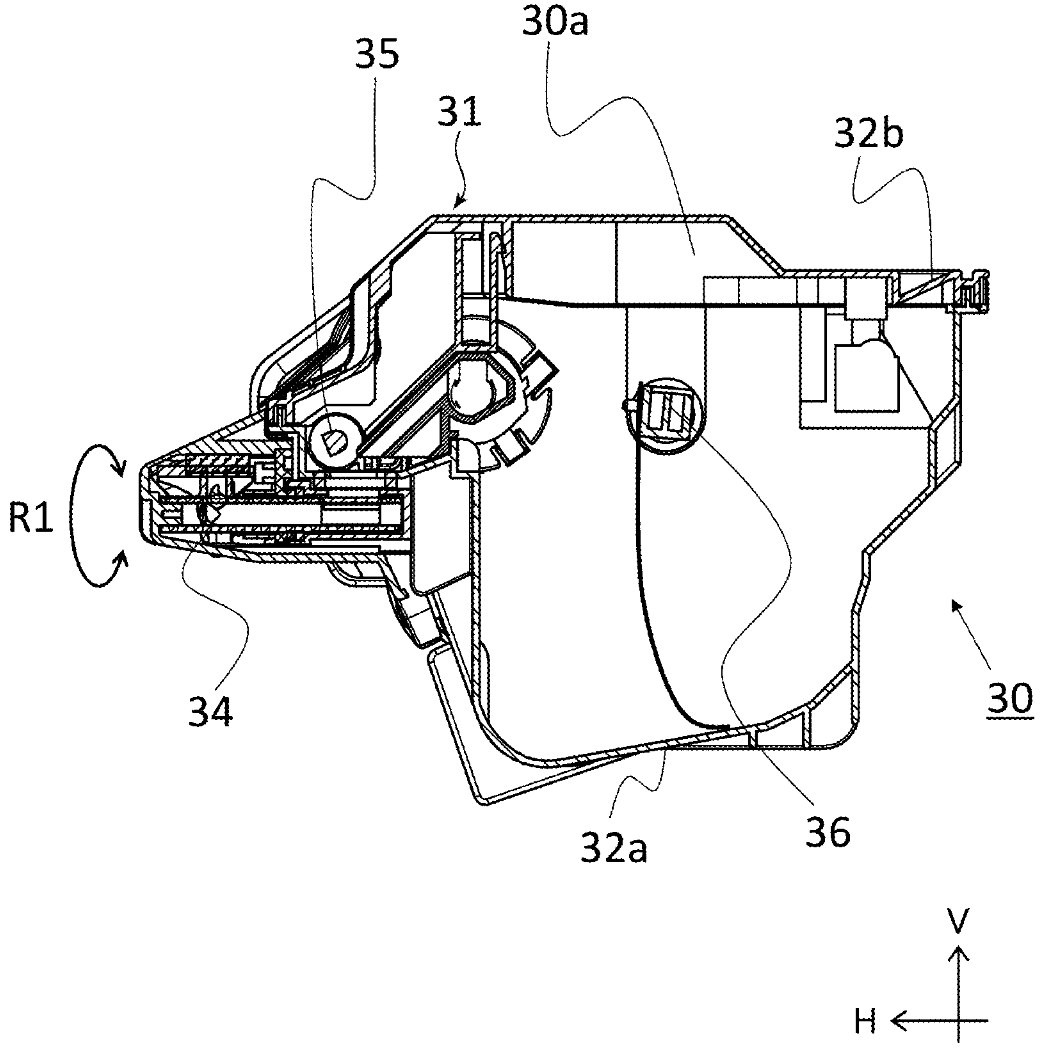

FIG. 11 is a sectional view of the toner cartridge taken along a d-d line of FIG. 10.

Figure 12:
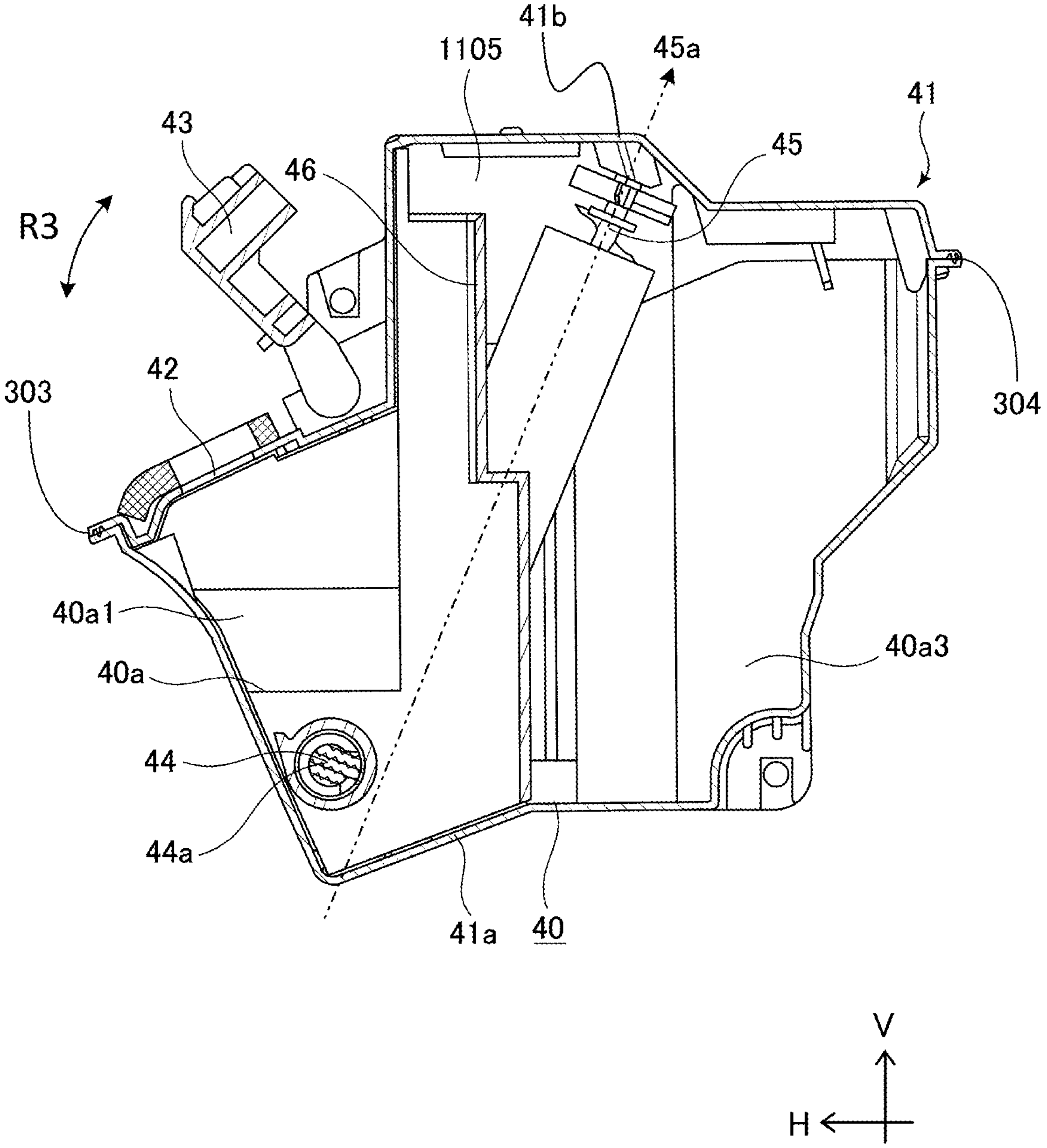

FIG. 12 is a sectional view of the toner cartridge taken along an e-e line of FIG. 10.

Figure 13:
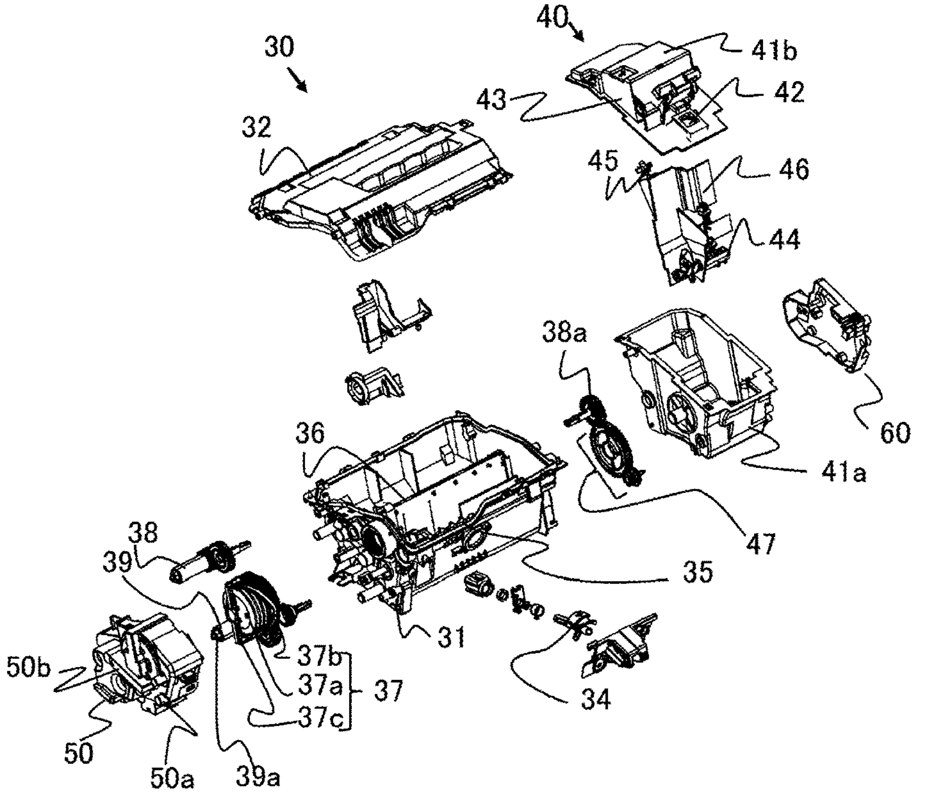
Figure 13:
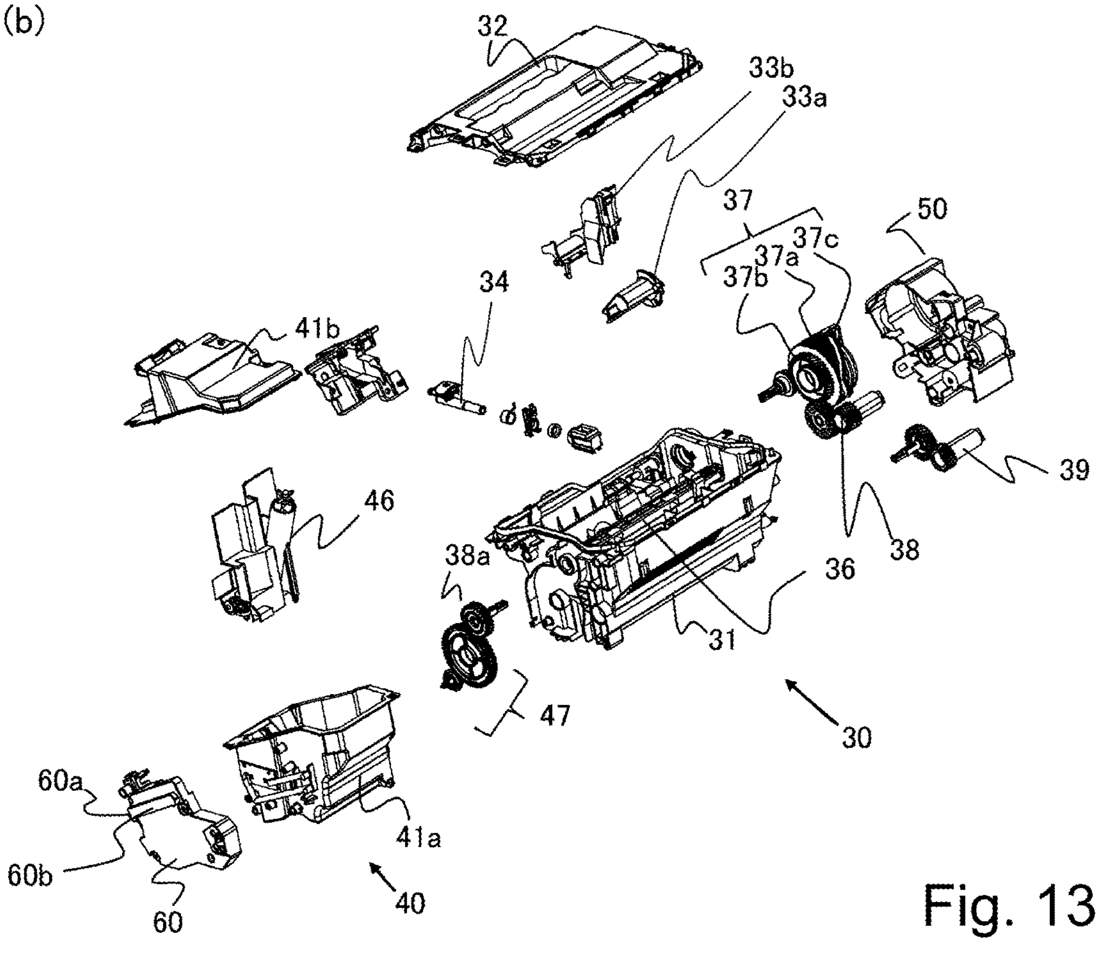

Parts (a) and (b) of FIG. 13 are exploded perspective views of the toner cartridge as viewed in different directions.

Figure 14:
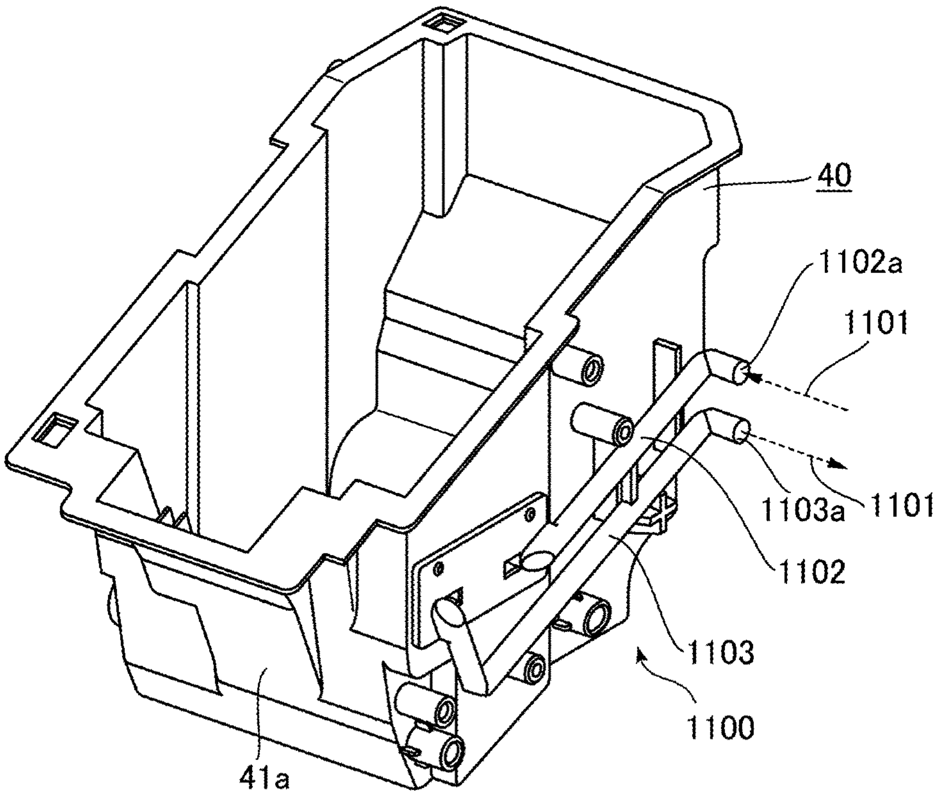
Figure 14:
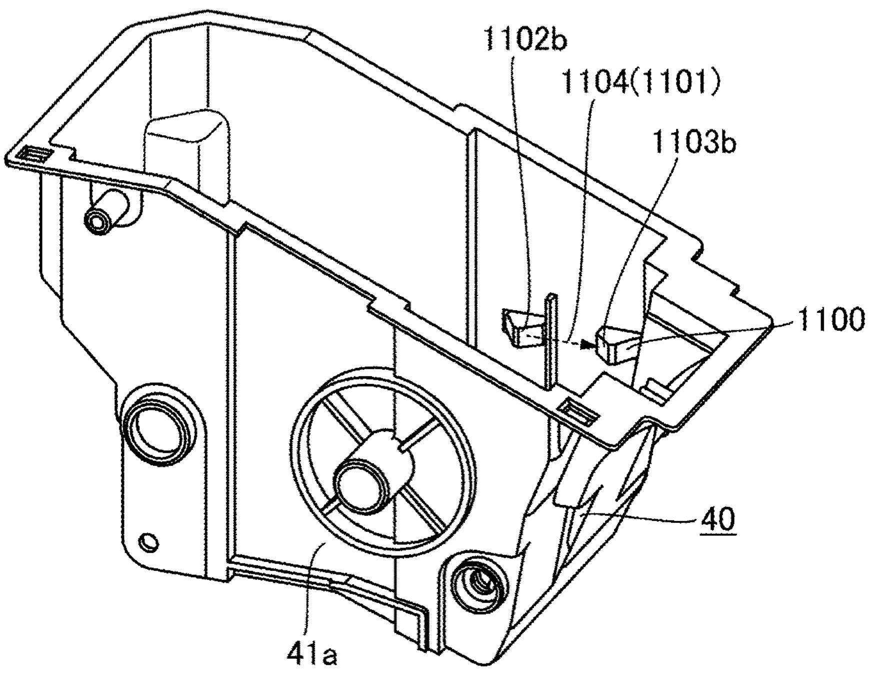

Parts (a) and (b) of FIG. 14 are perspective views of the toner cartridge as viewed in different directions.

Figure 15:
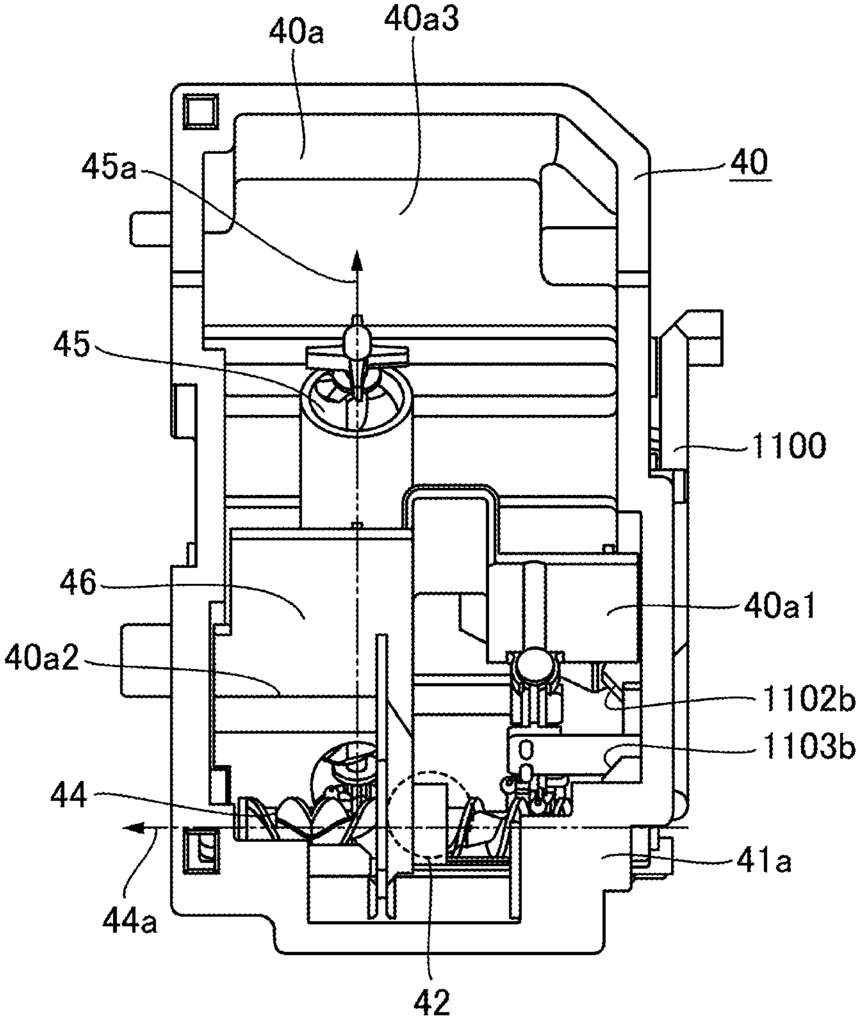

FIG. 15 is a perspective view of a residual toner accommodating unit according to the embodiment.

Figure 16:
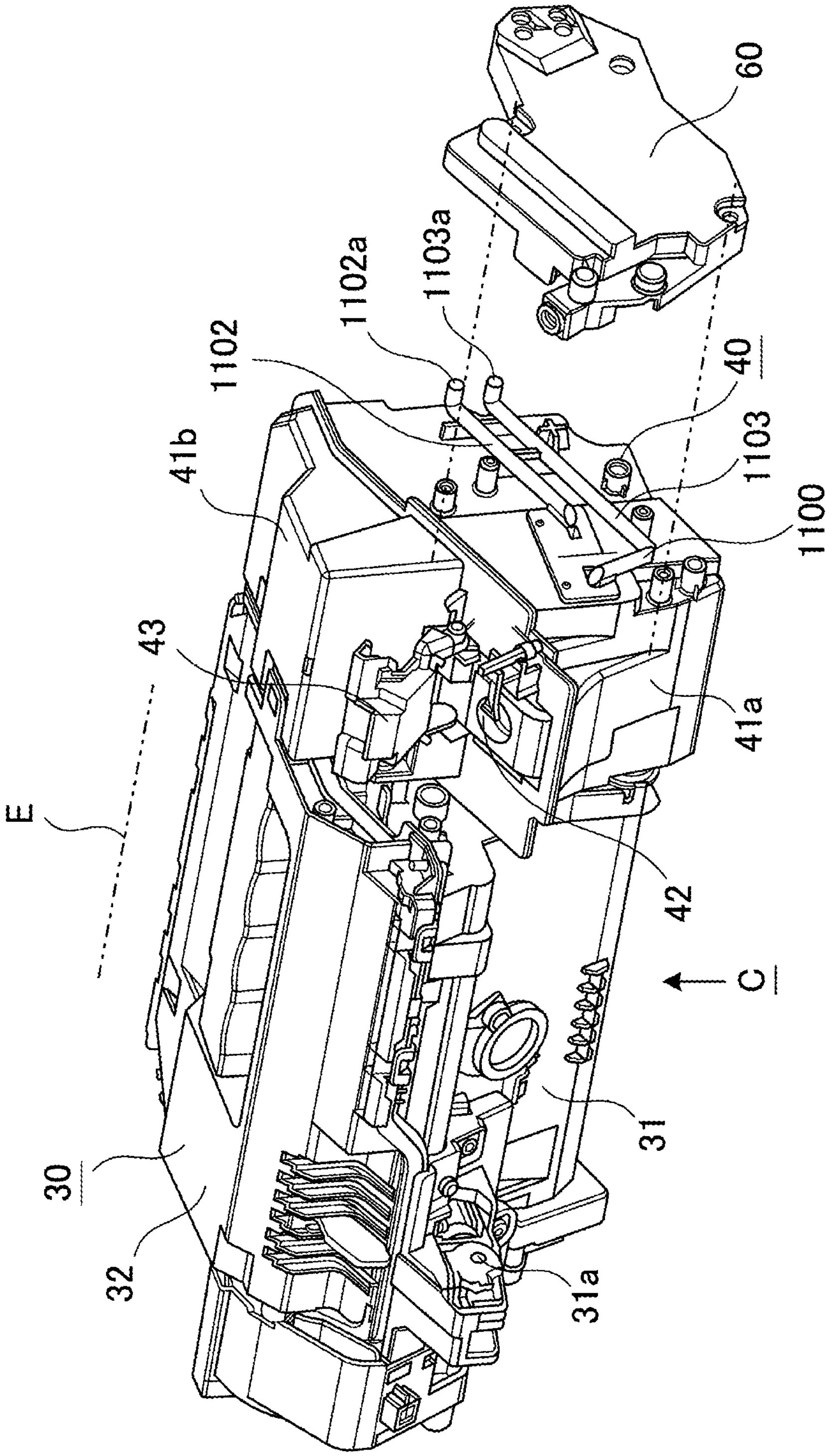

FIG. 16 is a partially exploded perspective view of the toner cartridge according to the embodiment.

Figure 17:
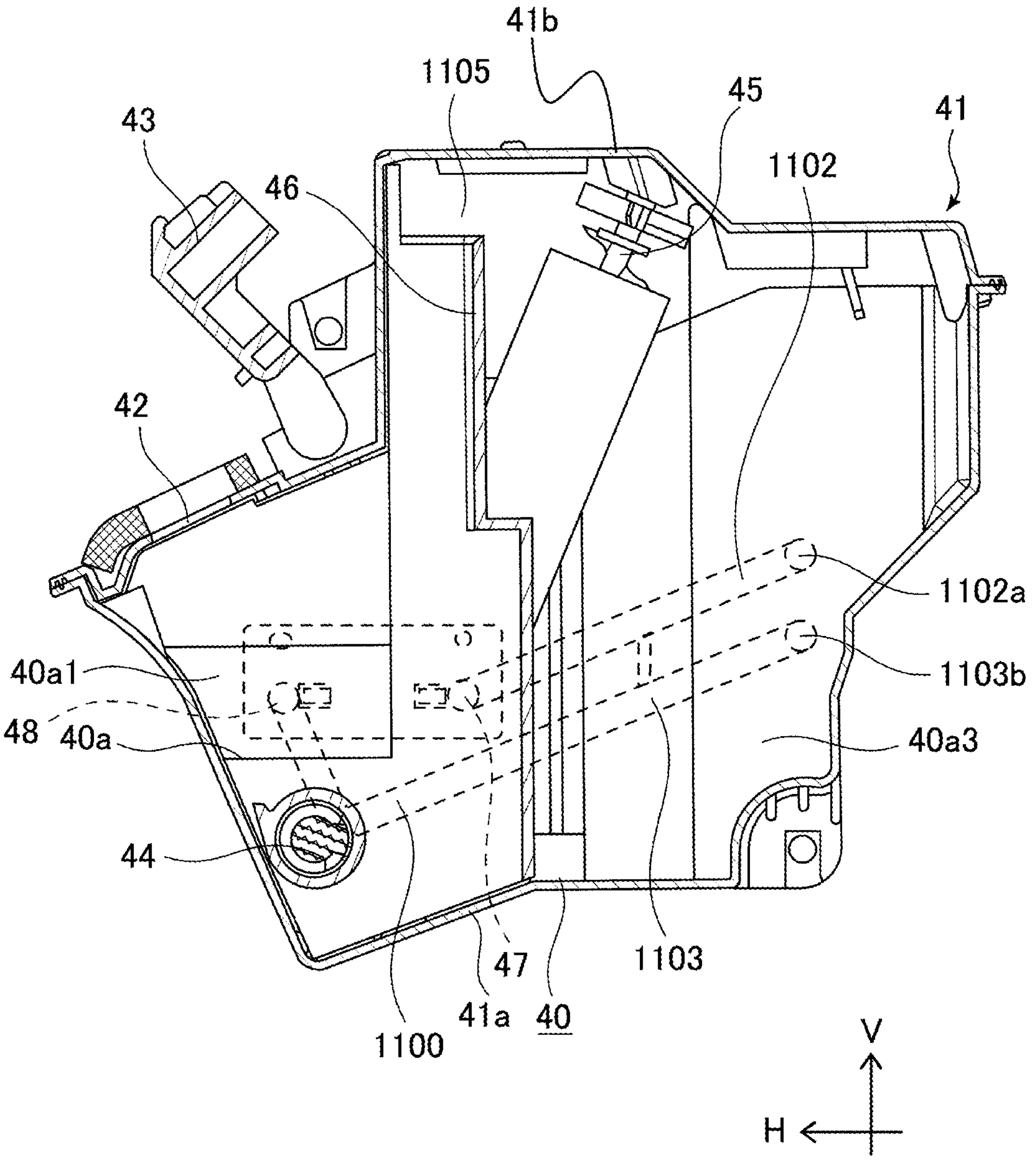

FIG. 17 is a sectional view of the residual toner accommodating unit according to the embodiment.

Figure 18:
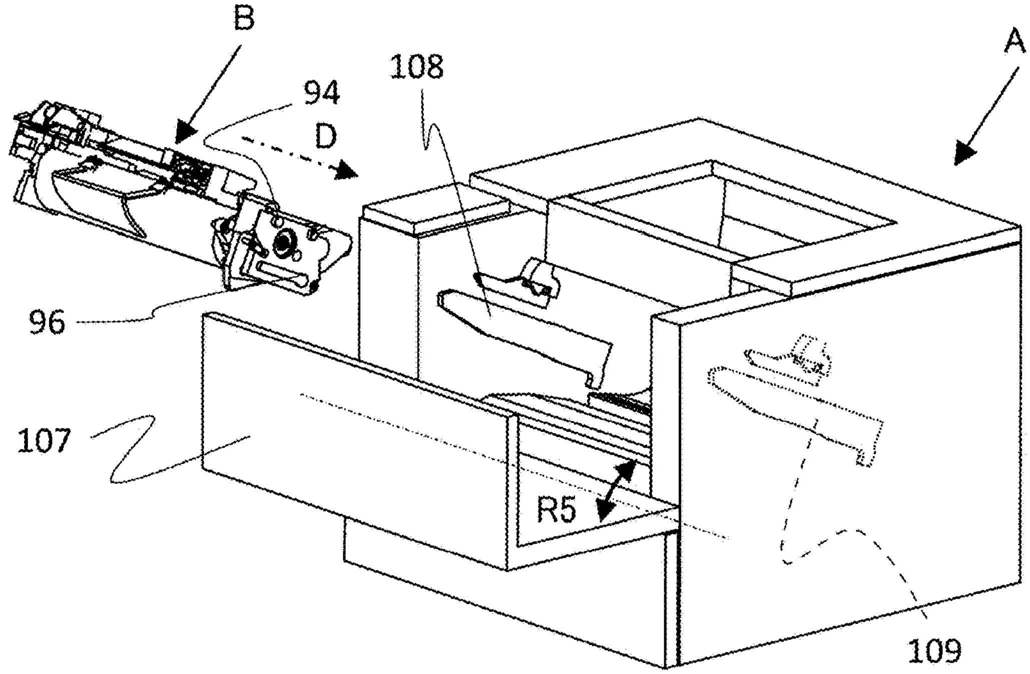
Figure 18:
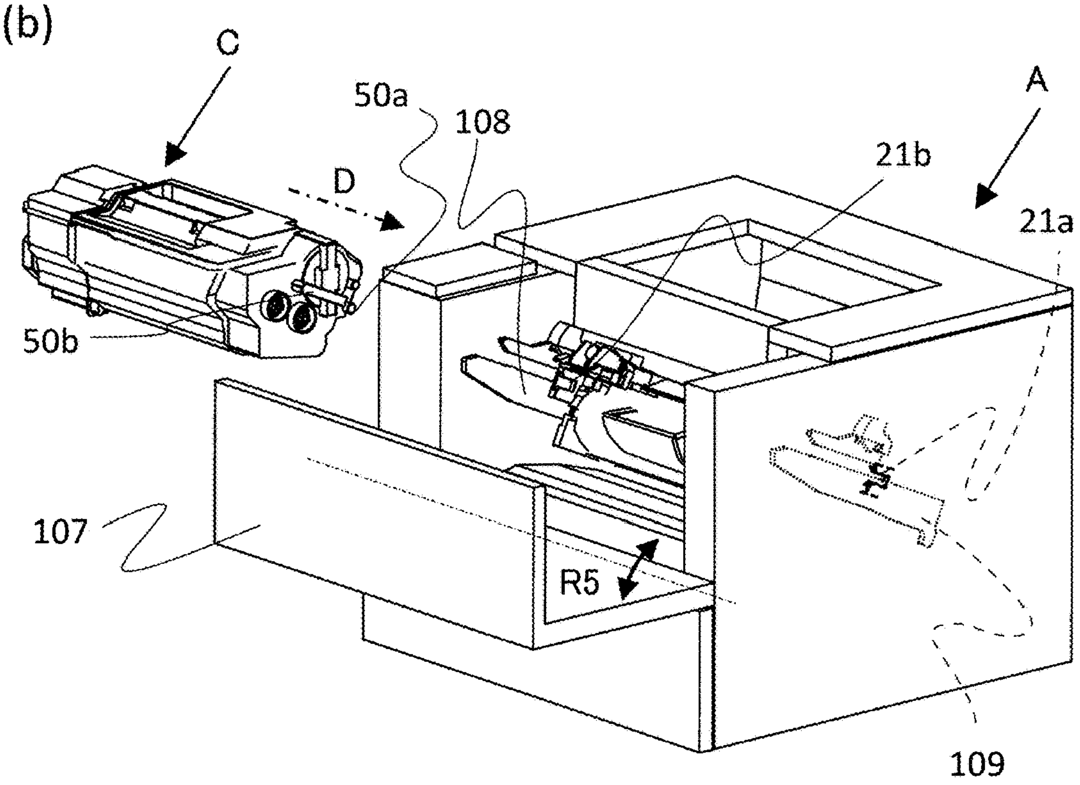

Parts (a) and (b) of FIG. 18 are schematic perspective views showing an inserting state of the process cartridge into an apparatus main assembly and an inserting state of the toner cartridge into the apparatus main assembly, respectively.

Figure 19:
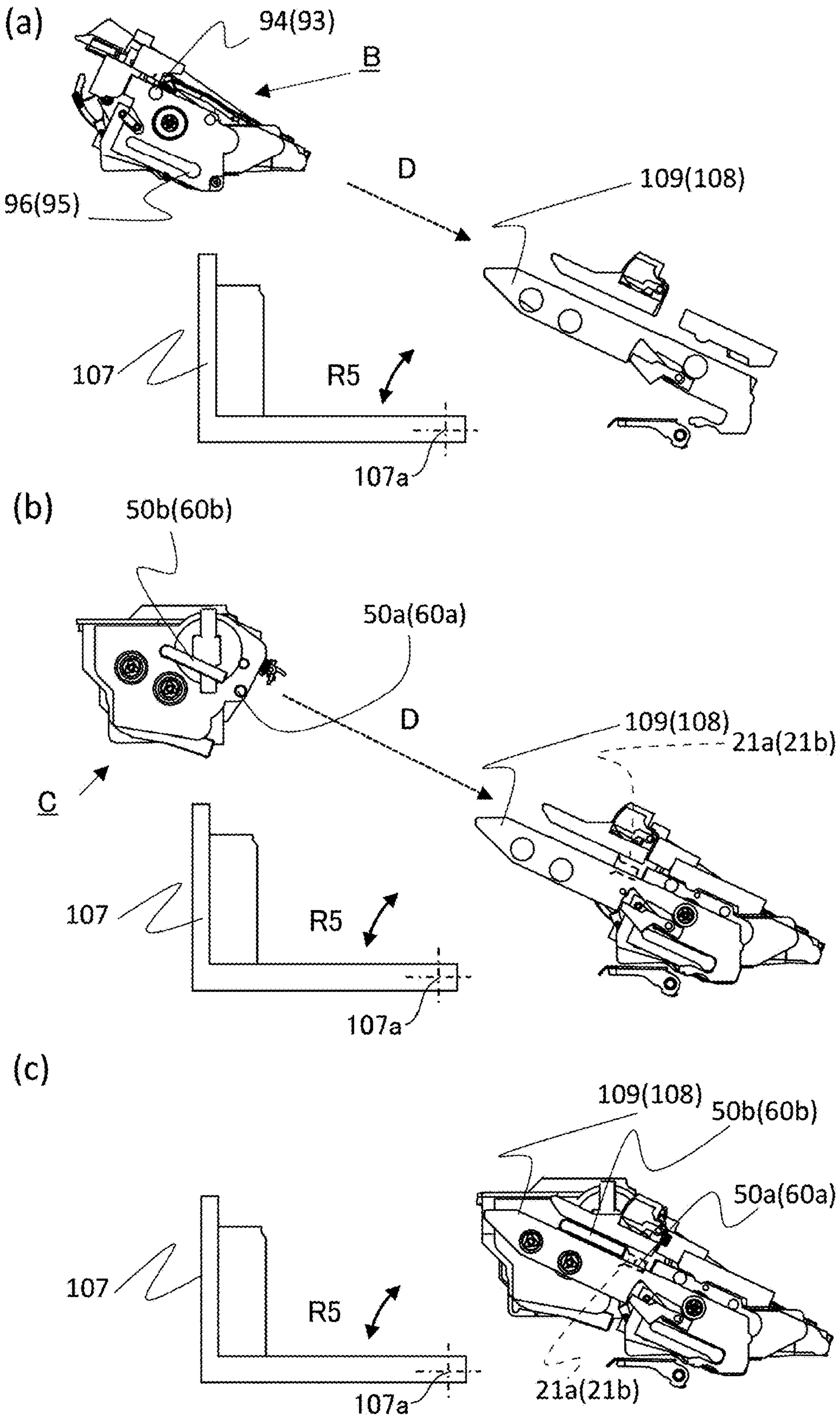

Part (a) of FIG. 19 is a schematic side view showing an inserting the process cartridge into the apparatus main assembly, part (b) of FIG. 19 is a schematic side view showing an inserting the toner cartridge into the apparatus main assembly, and part (c) of FIG. 19 is a schematic side view showing a state in which the process cartridge and the toner cartridge are mounted in the apparatus main assembly.

DESCRIPTION OF THE EMBODIMENTS

Figure 1:
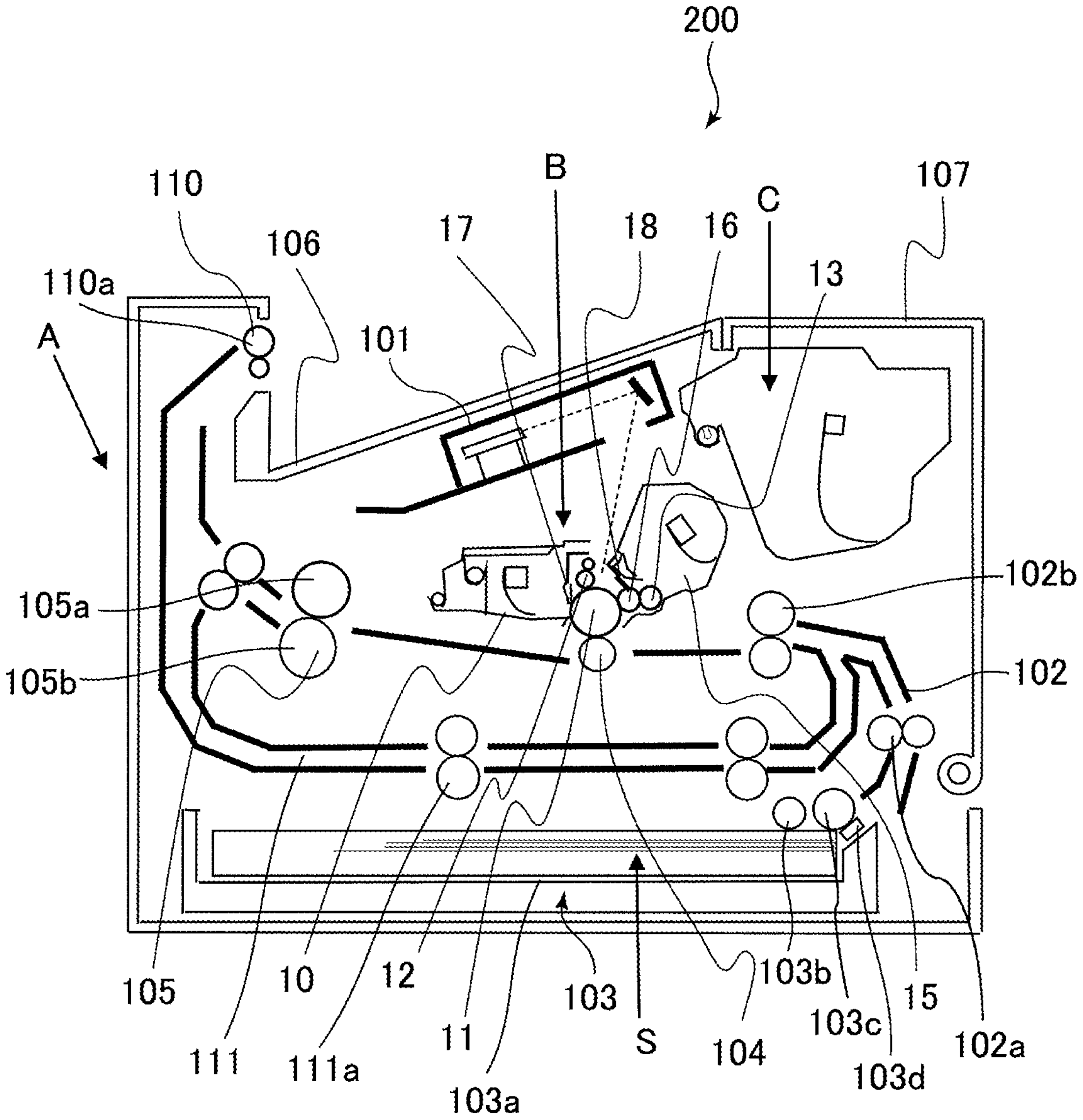
FIG. 1 is a schematic sectional view of an image forming apparatus according to an embodiment.

An embodiment will be described using FIG. 1 to part (c) of FIG. 19. First, a schematic structure of an image forming apparatus of this embodiment will be described using FIG. 1.

[Image Forming Apparatus]

An image forming apparatus 200 is a laser beam printer of an electrophotographic type. As shown in FIG. 1, the image forming apparatus 200 includes an apparatus main assembly (printer main body) A, a process cartridge B as an image forming portion, and a toner cartridge C. The apparatus main assembly A includes a laser scanner 101, a sheet conveying portion 102, a surface feeding portion 103, a transfer roller 104, a fixing portion 105, a sheet discharging portion 110, a reverse cleaning portion 111, and the like. Further, although described specifically later, in the apparatus main assembly A, the process cartridge Band the toner cartridge C are disposed detachably mountable to the apparatus main assembly A. For this purpose, the apparatus main assembly A is provided with an openable door 107.

The process cartridge B includes a photosensitive drum 11 as an image bearing member and a photosensitive member, a charging roller 12 as a charging member, a developing unit 15, and a cleaning blade 17 as a cleaning member. Above the process cartridge B, the laser scanner 101 as an exposure device is provided.

The charging roller 12 is disposed in contact with an outer peripheral surface of the photosensitive drum 11 and electrically charges the photosensitive drum 11 under application of a voltage from the apparatus main assembly A. Further, the charging roller 12 is rotated by rotation of the photosensitive drum 11. The developing unit 15 includes a developing roller 16 as a developer carrying member for carrying and conveying toner as a developer. The developing roller 16 is provided opposed to the photosensitive drum 11.

The cleaning blade 17 is an elastic member disposed in contact with the outer peripheral surface of the photosensitive drum 11, and cleans the surface of the photosensitive drum 11. The cleaning blade 17 elastically contacts the photosensitive drum 11 at a free end thereof, and thus removes, from the photosensitive drum 11, toner remaining after a sheet S described later passes through between the photosensitive drum 11 and the transfer roller 104.

The sheet feeding portion 103 includes a cassette 103*a*, a pick-up roller 103*b* for feeding an uppermost sheet accommodated in the cassette 103*a*, and a separation roller 103*c* and a separation pad 103*d* which are used for separating the sheet S one by one fed by the pick-up roller 103*b*. The sheet conveying portion 102 includes a conveying roller pair 102*a* and a registration roller pair 102*b* which are used for conveying the sheet S fed from the sheet feeding portion 103. The registration roller pair 102*b* conveys the sheet S to a transfer portion between the photosensitive drum 11 and the transfer roller 104 in synchronism with a timing of a toner image formed on the photosensitive drum 11.

The fixing portion 105 includes a fixing roller 105*a* heated by a heating source such as a heater and a pressing roller 105*b* forming a fixing nip in which the sheet S is nipped between the fixing roller 105*a* and the pressing roller 105*b*. The sheet S on which the toner image is transferred in the transfer portion is conveyed to the fixing portion 105 and is heated and pressed in the fixing nip. By this, the toner image is fixed on the sheet S.

The sheet discharging portion 110 includes a discharging roller pair 110*a* and discharges the sheet S, on which the toner image is fixed, onto a discharge tray 106 by the discharging roller pair 110*a*. The reverse conveying portion 111 includes a reverse conveying roller pair 111*a* and reverses front and back sides (surfaces) of the sheet S passed through the fixing portion 105 in the case where images are formed on the both sides of the sheet S, and then conveys the sheet S toward the registration roller pair 102*b*.

Next, an operation of the image forming apparatus 200 will be described using FIG. 1. The photosensitive drum 11 rotationally driven by an unshown driving source (motor) is electrically charged uniformly to a predetermined potential. The surface of the photosensitive drum 11 after the charging is exposed to light on the basis of image information by the laser scanner 101, and an electric charge in an exposure portion is removed, so that an electrostatic latent image is formed. To the electrostatic latent image on the photosensitive drum 11, the toner is supplied from the developing roller 16, so that the electrostatic latent image is visualized as the toner image.

On the other hand, in parallel to such a toner image forming operation, the sheet S is fed from the sheet feeding portion 103. The sheet S fed from the sheet feeding portion 103 is conveyed to the transfer portion by the registration roller pair 102*b* while being timed to formation of the toner image on the photosensitive drum 11. When the sheet S passed through the transfer portion, a voltage is applied from the apparatus main assembly A to the transfer roller 104, so that the toner image on the photosensitive drum 11 is transferred as an unfixed image onto the sheet S. Thereafter, the sheet S on which the toner image is fixed is conveyed to the transfer portion 105, so that the unfixed image is heated and pressed, and thus is fixed on the surface of the sheet S. The sheet S on which the toner image is fixed is discharged and stacked on the discharge tray 106 by the sheet discharging portion 110. Incidentally, in the case where the images are formed on the both sides of the sheet S, the sheet S is conveyed to the reverse conveying portion 111, and the toner image is formed on the back side of the sheet S similarly as described above.

[Process Cartridge]

Figure 2:
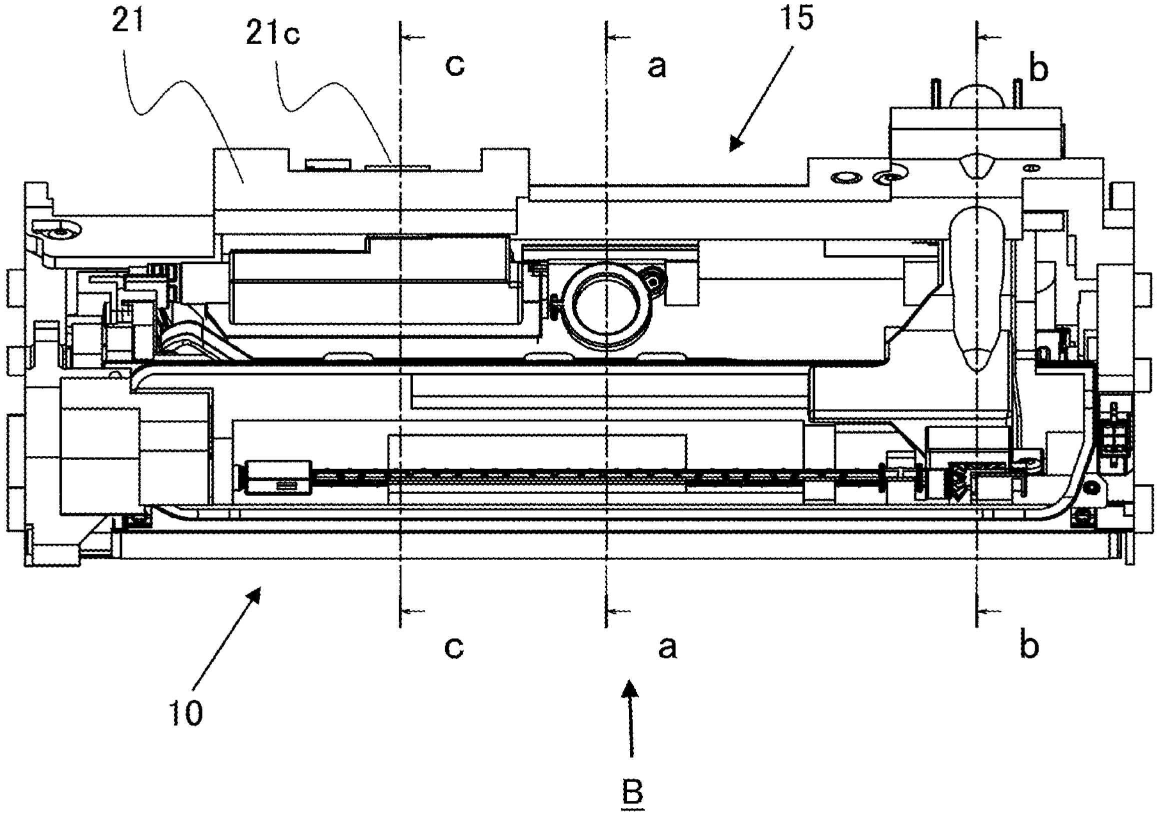
FIG. 2 is a front view of a process cartridge according to the embodiment.
Figure 3:
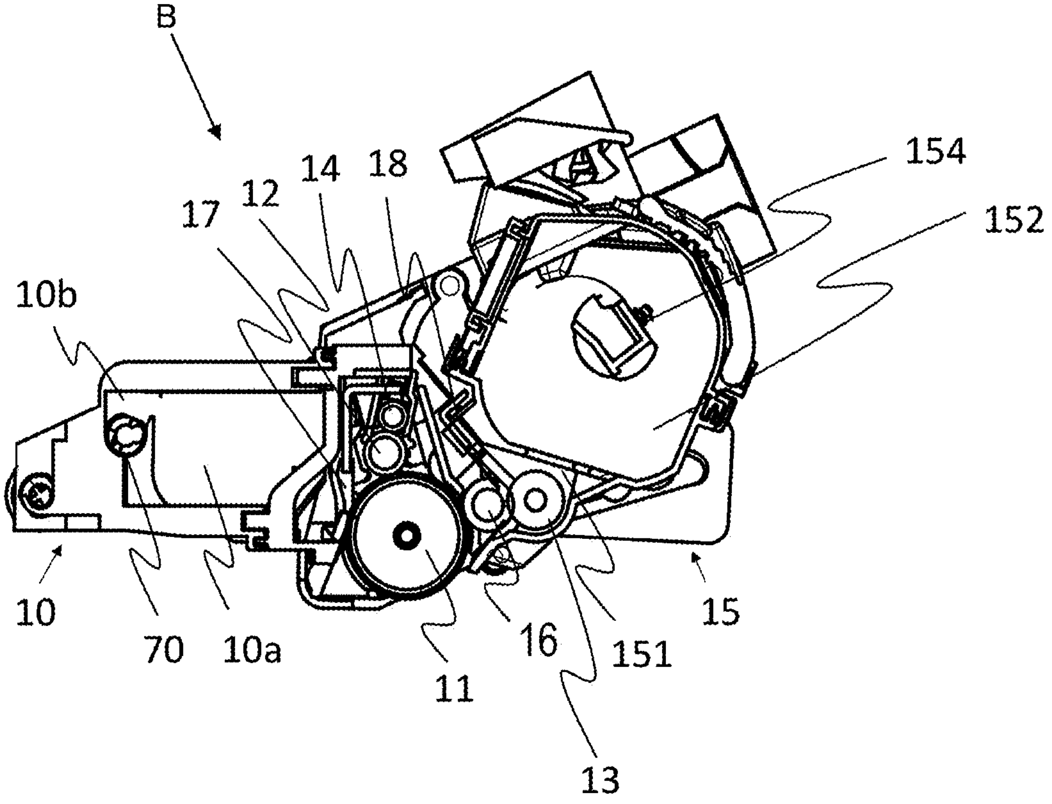
FIG. 3 is a sectional view of the process cartridge taken along an a-a line of FIG. 2.
Figure 4:
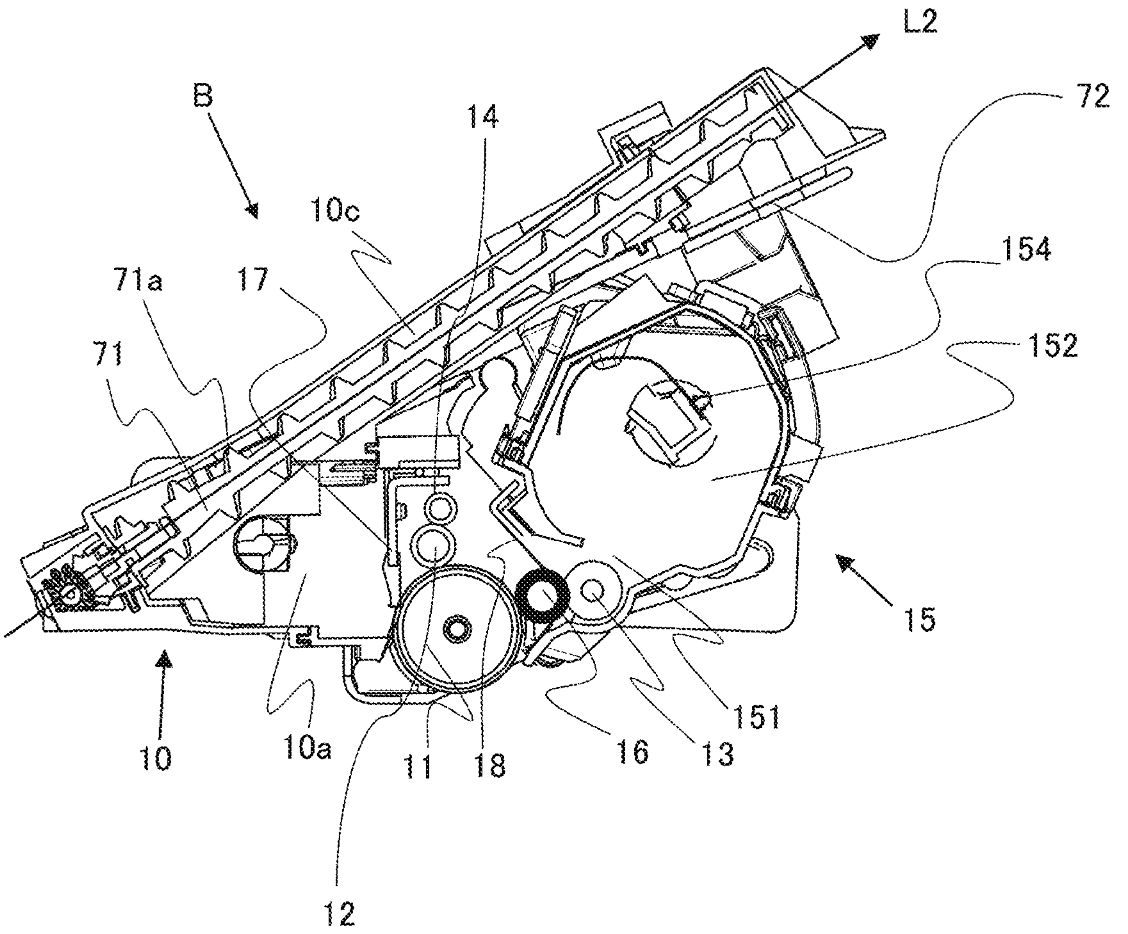
FIG. 4 is a sectional view of the process cartridge B taken along a b-b line of FIG. 2.

The process cartridge B will be described using FIGS. 2 to 7. As shown in FIGS. 2 to 4, the process cartridge B is constituted by a cleaning unit 10 provided with the cleaning blade 17 and the like and a developing unit 15 provided with the developing roller 16. The cleaning unit 10 includes the photosensitive drum 11, the cleaning blade 17, the charging roller 12, a charging roller cleaner 14 as a cleaning member for the charging roller 12, a residual toner primary accommodating portion 10*a*, a first residual toner feeding passage 10*b*, and a second residual toner feeding passage 10*c*. Toner (residual toner) removed from the photosensitive drum by the cleaning blade 17 is conveyed from the residual toner primary accommodating portion 10*a* to the toner cartridge C through the first residual toner feeding passage 10*b* and the second residual toner feeding passage 10*c*.

Figure 5:
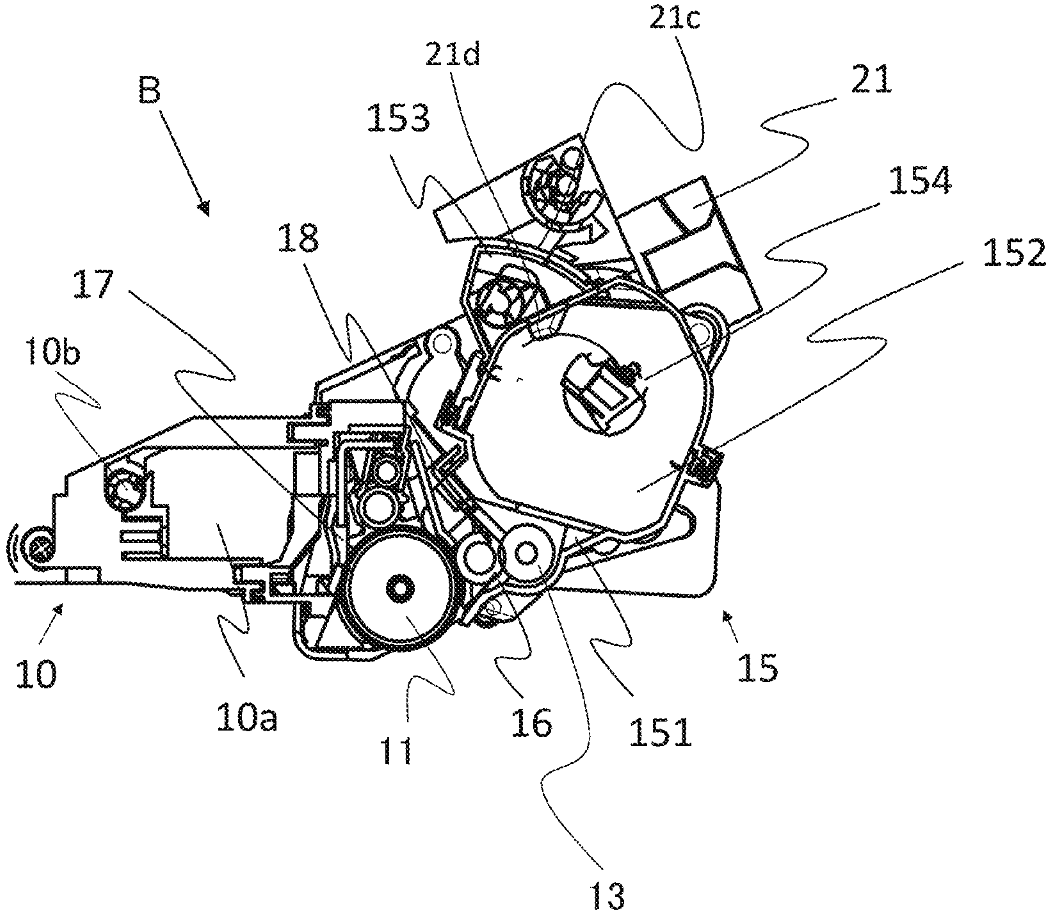
FIG. 5 is a sectional view of the process cartridge B taken along a c-c line of FIG. 2.

As shown in FIG. 5, the developing unit 15 includes the developing roller 16, a supplying roller 13, a developing blade 18, a developing chamber 151 in which the developing roller 16 is disposed, a developer accommodating chamber 152 from which the toner is supplied to the developing chamber 151, and a toner receiving chamber 153 for receiving the toner supplied from the toner cartridge C. The developing roller 16 supplies the toner to a developing region.

Then, the developing roller 16 develops the electrostatic latent image, with the toner, formed on the photosensitive drum 11. The supplying roller 13 supplies the toner in the developing chamber 151 to the developing roller 16. Such a supplying roller 13 is disposed so that a rotational axis direction thereof is parallel to a rotational axis direction of the developing roller 16, an on an outer peripheral surface thereof, an elastic layer such as a sponge or the like is formed so that the developer is easily conveyed. The developing blade 18 contacts a peripheral surface of the developing roller 16 and defines an amount of the toner deposited on the peripheral surface of the developing roller 16. Further, the developing blade 18 imparts a triboelectric charge to the toner.

The toner accommodated in the developer accommodating chamber 152 is sent to the developing chamber 151 by rotation of a stirring member 154 and then is supplied to the developing roller 16. A remaining amount of the toner in the developer accommodating chamber 152 is detected by an unshown remaining amount detecting portion. Then, when the amount of the toner in the developer accommodating chamber 152 becomes a certain amount or less, the toner is supplied to the process cartridge B by the toner cartridge C. Supply of the toner from the toner cartridge C to the developing unit 15 of the process cartridge B is made through a supply opening 21*c* of a stay 21, the toner receiving chamber 153, and a delivery opening 21*d*, so that the toner is accommodated in the developer accommodating chamber 152.

Next, the constitution of the process cartridge B will be described more specifically using FIG. 3, parts (a) and (b) of FIG. 6, and parts (a) and (b) of FIG. 7. As described above, the cleaning unit 10 includes the photosensitive drum 11, the charging roller 12, and the cleaning blade 17. Similarly, the developing unit 15 includes the developing roller 16, the developing blade 18, the developing chamber 151, the developer accommodating chamber 152, and the toner receiving chamber 153.

As shown in parts (a) and (b) of FIG. 6, the cleaning unit 10 is constituted by a cleaning frame 20, the stay 21, and a side cover 7. The cleaning frame 20 supports the cleaning blade 17, the charging roller 12, and the charging roller cleaner 14. As shown in part (b) of FIG. 6, the photosensitive drum 11 is rotatably supported by a drum pin 22 mounted in the cleaning frame 20 on one side and by a photosensitive drum supporting portion 7*b* provided on the side cover 7 on the other side (opposite side).

Further, as shown in parts (a) and (b) of FIG. 6, at an end portion of the developing roller 16 with respect to an axial direction, bearing members 4 and are disposed, and the developing unit 15 is connected to the cleaning unit 10 so as to be rotatable about a swing axis defined by a rectilinear line including supporting axes 8*a* and 8*b*. The swing axis 8 is disposed substantially parallel to a rotational axis 11*b* of the photosensitive drum 11.

A constitution in which the developing unit 15 is supported by the cleaning unit 10 will be specifically described. As shown in part (a) of FIG. 6, a cylindrical shape portion 5*a* provided on the bearing member 5 is supported by a cylindrical hole portion 7*a* provided in the side cover 7. The supporting axis 8*b* is defined by a common axis to the cylindrical hole portion 7*a* of the side cover 7 and the cylindrical shape portion 5*a* of the bearing member 5. Further, at a rotation center of the cylindrical shape portion 5*a* of the bearing member 5, a developing coupling 155 as a drive input member for receiving drive from the apparatus main assembly A is provided.

Further, as shown in part (b) of FIG. 6, a pin 6 is inserted so as to extend over a cylindrical hole portion 20*a* of the cleaning frame 20 of the cleaning unit 10 and the cylindrical hole portion 4*a* of the bearing member 4.

The supporting axis 8*b* is defined by a common axis to the pin 6 and the cylindrical hole portion 4*a* of the bearing member 4. The supporting axes 8*a* and 8*b* are disposed coaxially with each other, and as described above, the swing axis 8 is defined by a rectilinear line including the supporting axes 8*a* and 8*b*.

As described above, the developing unit 15 is supported rotatably about the swing axis 8 relative to the cleaning unit 10. Further, the developing unit 15 is urged toward the photosensitive drum 11 of the cleaning unit 10 by pressing springs 19*a* and 19*b* which are elastic members, so that the developing roller 16 is contacted to the photosensitive drum 11.

Next, a contact and separation operation of the developing unit 15 relative to the cleaning unit 10 will be described using parts (a) and (b) of FIG. 7. Incidentally, parts (a) and (b) of FIG. 7 are illustrations in which the side cover 7 is omitted for illustrating a separation mechanism 100 of the apparatus main assembly A. As shown in part (a) of FIG. 7, a projected portion 5*b* is provided in a position where the bearing member 5 opposes the separation mechanism 100. In this embodiment, in a state in which the process cartridge B is mounted in the apparatus main assembly, the separation mechanism 100 is provided below the developing unit 15. Further, the projected portion 5*b* is provided at a lower end portion of the bearing member 5. The separation mechanism 10 is provided in the apparatus main assembly and is swingable substantially in up-down direction about a swing axis 100*a* as a center by a driving source such as an unshown motor.

As shown in part (a) of FIG. 7, in a position where the projected portion 5*b* does not contact the separation mechanism 100, the developing roller 16 is contacted to the photosensitive drum 11 by an urging force of the pressing springs 19*a* and 19*b*.

This position is an image forming position where the electrostatic latent image formed on the surface of the photosensitive drum 11 is capable of being developed by the developing roller 16.

As shown in part (b) of FIG. 7, the separation mechanism 100 provided in the apparatus main assembly A swings about the swing axis 100*a* and contacts the projected portion 5*b* receives a force from the separation mechanism 100, so that the developing unit 15 is rotated about the swing axis 8 and a rotation center in an arrow R2 direction. By this, the developing roller 16 is separated from the photosensitive drum 11 against the urging force of the pressing springs 19*a* and 19*b*. This position is a non-image forming position retracted from the image forming position.

When the separation mechanism 100 returns from the position of part (b) of FIG. 7 to the position of part (a) of FIG. 7 which is an original position, the separation mechanism 100 is separated from the projected portion 5*b*. Then, by the urging force of the pressing springs 19*a* and 19*b*, the developing roller 16 is contacted to the photosensitive drum 11 again. Thus, in this embodiment, the position of the developing unit 15 is capable of being switched between a contact position (image forming position) and a separated position (non-image forming position) by the separation mechanism 100. That is, an attitude of the developing unit 15 in the process cartridge B is switchable between the contact position and the separated position relative to the photosensitive drum 11. By this, it is possible to suppress toner deterioration and unnecessary toner consumption during non-image formation.

[Residual Toner Feeding Constitution Inside Cleaning Unit]

A residual toner feeding constitution inside the cleaning unit 10 will be described using FIGS. 3, 4, and 8. FIG. 8 is a schematic sectional view of the cleaning unit 10 when the cleaning unit 10 is viewed from a top surface side. As shown in FIGS. 3, 4, and 8, the first residual toner feeding passage 10*b* disposed in a direction parallel to the drum axis is provided with a first residual toner feeding member 70, and the second residual toner feeding passage 10*c* disposed in a direction (indicated by arrow L2) perpendicular to the drum axis is provided with a second residual toner feeding member 71. Further, the second residual toner feeding passage 10*c* and the second residual toner feeding member 71 are disposed inside an end portion of the cleaning blade 17 with respect to the drum axis direction (longitudinal direction).

As described above, the residual toner on the photosensitive drum 11 is collected in the residual toner primary accommodating portion 10*a* by the cleaning blade 17. When the residual toner primary accommodating portion 10*a* is filled with the residual toner, the remaining residual toner reaches the first residual toner feeding passage 10*b*. The residual toner reached the first residual toner feeding passage 10*b* is fed in the drum axis direction by a helical portion provided in the first residual toner feeding member 70. Then, the residual toner fed by the first residual toner feeding member 70 reaches the second residual toner feeding passage 10*c*. The residual toner reached the second residual toner feeding passage 10*c* is fed above the cleaning blade 17 and in a direction perpendicular to the drum axis by a helical portion 71*a* (third residual toner feeding member) of the second residual toner feeding member 71. Further, the residual toner fed to an end portion of the second residual toner feeding member 71 is discharged from a residual toner discharge opening 72 into the residual toner accommodating portion 40 of the toner cartridge C described below through a residual toner receiving opening 42 (see FIG. 10 and the like).

[Toner Cartridge]

Next, the toner cartridge C will be described using FIGS. 7 and 9 to 17. As shown in FIG. 9, the toner cartridge includes a toner accommodating unit 300 constituted so as to include a first end portion (left-side end portion of FIG. 10) and a second end portion (right-side end portion of FIG. 10) on a side opposite from the first end portion with respect to an axial direction E (first direction) and includes a third end portion (left-side end portion of FIGS. 11, 12 and 17) and a fourth end portion (right-side end portion of FIGS. 11, 12, and 17) on a side opposite from the third end portion with respect to a horizontal direction H crossing the axial direction E and so as to accommodate the toner.

The horizontal direction H is a horizontal direction in the case where the toner cartridge C is viewed in the axial direction E in a state in which the toner cartridge C is mounted in the apparatus main assembly A, and is a direction perpendicular to the axial direction E in this embodiment. In other words, the horizontal direction H is a horizontal direction in the case where the toner cartridge C is directed to a direction when the toner cartridge C is mounted in the apparatus main assembly A. Further, in the following description, the first, second, third, and fourth end portions are also referred to as a left end portion 301, a right end portion 302, a front end portion 303, and a rear end portion 304, respectively.

The toner accommodating unit 300 includes a toner supplying unit 30 and a residual toner accommodating unit 40. The toner cartridge C is detachably mountable together with the process cartridge B to the apparatus main assembly A and is also detachably mountable to the process cartridge B.

The toner supplying unit 30 is extended in the axial direction E which is the longitudinal direction of the toner cartridge C and is capable of supplying the toner to the process cartridge B. The residual toner accommodating unit 40 is disposed on the right end portion 302 (second end portion) side of the toner supplying unit 30 with respect to the axial direction E and is capable of accommodating the residual toner collected by the process cartridge B.

[Toner Supplying Unit]

The toner supplying unit 30 includes, as shown in FIGS. 9 to 11, a toner accommodating container 31 as a first accommodating portion and a toner discharge opening 31*a* which is provided outside the toner cartridge C and which is used as a discharge opening for permitting discharge of the toner from the toner accommodating container 31. The toner accommodating container 31 is formed by a supplying member frame 32*a* including the toner accommodating portion and by a supplying portion cover 32*b*. Further, the supplying member frame 32*a* is provided with the toner discharge opening 31*a* through which the toner is discharged from the toner accommodating portion 30*a*. Further, a shutter member 34 capable of opening and closing the toner discharge opening 31*a* is provided. The shutter member 34 is rotated in an arrow R1 direction in interrelation with a mounting and demounting operation of the toner cartridge C relative to the process cartridge B, so that the shutter member 34 opens and closes the toner discharge opening 31*a*. The shutter member 34 is disposed outside the supplying member frame 32*a*. Further, as shown in FIGS. 9 and 10, the toner accommodating container 31 is provided with a cover 33*a* as a sealing member for sealing a filling opening 33 for permitting filling of the toner accommodating container 31 with the toner.

As shown in FIG. 11, the toner accommodating portion 30*a* includes, as a toner feeding member for feeding the toner to the toner discharge opening 31*a* (FIG. 9), a toner accommodating portion screw member 35 for feeding the toner toward the toner discharge opening 31*a*. Further, the toner accommodating portion 30*a* includes a toner accommodating portion stirring and feeding unit 36 for feeding the toner toward the toner accommodating portion screw member 35 while stirring the toner. The toner accommodating portion stirring and feeding unit 36 is rotatable about a rotational axis extending in the axial direction E and stirs the toner in the toner accommodating container 31.

Further, as shown in parts (a) and (b) of FIG. 13, the toner fed to the toner discharge opening 31*a* is discharged to an outside through the toner discharge opening 31*a* by a volume fluctuation of a pump 37*a* provided in a pump unit 37. The pump unit 37 is provided on the left end portion 301 side (first end portion side) of the toner accommodating container 31 with respect to the axial direction E and is constituted by the pump 37*a* changing in volume by expansion and contraction, a cam 37*b* expanded and contracted by rotation of the pump 37*a*, and a link arm 37*c*. Further, as shown in FIG. 7, the toner supplying unit 30 includes a stirring drive input portion 38 which is provided at one end thereof with respect to the axial direction E (longitudinal direction of FIGS. 9 and 10) and which is, as a toner feeding and driving portion for driving the toner feeding portion, for driving the toner accommodating portion stirring and feeding unit 36, and includes a pump/screw drive input portion 39 as a driving force receiving member for receiving, from an outside of the toner cartridge C, a driving force for driving the pump unit 37 and the toner accommodating portion screw member 35. The pump/screw drive input portion 39 is provided on a side surface of the toner cartridge C on the left end portion 301 side, and a rotational driving force is inputted from the apparatus main assembly A to a pump/screw coupling 39*a* which is a projected-shape portion. This rotational driving force is converted into reciprocating motion by the cam 37*b* and the link arm 37*c*. Then, by using this reciprocating motion, a bellow-shaped portion of the pump 37*a* is expanded and contracted, so that a volume fluctuation is made.

[Residual Toner Accommodating Unit]

As shown in FIG. 12 and parts (a) and (b) of FIG. 14, the residual toner accommodating unit 40 includes a residual toner receiving opening 42 as a receiving opening for receiving the toner from the outside of the toner cartridge C, for receiving the residual toner from the process cartridge B in this embodiment, a residual toner accommodating container 41 as a second accommodating portion in which the residual toner received through the residual toner receiving opening 42 is accommodated, and a light transmitting portion 1100 through which detection light for detecting an amount of the residual toner accommodated in the residual toner accommodating container 41.

The residual toner accommodating container 41 is formed by a residual toner accommodating portion frame 41*a* as a frame including the residual toner accommodating portion 40*a* and by a residual toner accommodating cover 41*b*. The residual toner accommodating cover 41*b* is provided with a residual toner receiving opening 42 for receiving the residual toner collected from the process cartridge B. The residual toner accommodating cover 41*b* includes a residual toner shutter member 43 for opening and closing the residual toner receiving opening 42. The residual toner shutter member 43 is opened and closed in an arrow R3 direction of FIG. 12 in interrelation with the mounting and demounting of the toner cartridge C relative to the apparatus main assembly A.

Further, as shown in parts (a) and (b) of FIG. 14 and FIG. 16, the residual toner accommodating unit 40 is provided with the above-described light transmitting portion 1100. The light transmitting portion 1100 is disposed between the residual toner accommodating portion 40*a* and a non-driving-side toner cartridge side cover 60. That is, with respect to the axial direction E, the light transmitting portion 1100 is disposed at an end portion (second end portion) of the toner cartridge C on a side opposite from the toner discharge opening 31*a* provided in the above-described toner supplying unit 30. Incidentally, the light transmitting portion 1100 is put in a state in which a portion other than a light-emitting-side incident surface 1102*a* and a light-receiving-side emergent surface 1103*a* which are described later is covered with the non-driving-side toner cartridge side cover 60 mounted on a side surface of the residual toner accommodating portion frame 41*a* on a right end side (see FIG. 9). The non-driving-side toner cartridge side cover 60 is provided with openings 61 and 62 through which the light-emitting-side incident surface 1102*a* and the light-receiving-side emergent surface 1103*a* are exposed to the outside, respectively.

[Light Transmitting Portion]

Here, the light transmitting portion 1100 will be specifically described using parts (a) and (b) of FIG. 14. Part (a) of FIG. 14 is a perspective view of the residual toner accommodating unit 40 viewed from the non-driving side. Part (b) of FIG. 14 is a perspective view of the residual toner accommodating unit 40 viewed from the driving side. Incidentally, in parts (a) and (b) of FIG. 14, for explanation, members other than the residual toner accommodating portion frame 41*a* and the light transmitting portion 1100 are not shown.

As shown in part (a) of FIG. 14, the light transmitting portion 1100 includes a light-emitting-side light transmitting member 1102 as a first light transmitting member and a light-receiving-side light transmitting member 1103 as a second light transmitting member. The light-emitting-side light transmitting member 1102 causes light irradiated from a light emitting element (not shown) such as an LED provided outside the residual toner accommodating unit 40 to emit light inside the residual toner accommodating container 41. The light-receiving-side light transmitting member 1103 receives the light emitted through the light-emitting-side light transmitting member 1102 emerges the light toward a light receiving element (not shown) such as a photo-transistor provided outside the residual toner accommodating unit 40. Incidentally, as shown in FIG. 17, with respect to the horizontal direction H, at a portion of the residual toner accommodating portion frame 41*a* closer to the front end portion 303 (third end portion) than to the rear end portion 304 (fourth end portion), a first opening 47 and a second opening 48 which communicate with an inside of the residual toner accommodating container 41 are provided. In this embodiment, the first opening 47 and the second opening 48 are arranged in the horizontal direction H.

The light-emitting-side light transmitting member 1102 includes the light-emitting-side incident surface 1102*a* as an incident surface and a light-emitting-side emergent surface 1102*b*. The light-emitting-side incident surface 1102*a* is such that the light irradiated from the light emitting element provided outside the residual toner accommodating container 41 (hereinafter, this light is referred to as detection light 1101) is capable of incident on the light-emitting-side incident surface 1102*a*. The light-emitting-side light transmitting member 1102 guides the detection light 1101 incident from the light-emitting-side incident surface 1102*a* to the inside of the residual toner accommodating container 41. The light-emitting-side emergent surface 1102*b* is provided inside the residual toner accommodating container 41 and is capable of emerging the detection light 1101 guided by the light-emitting-side light transmitting member 1102.

The light-emitting-side light transmitting member 1102 is provided so as to extend to the first opening 47 in a direction from the rear end portion 304 to the front end portion 303 of the toner cartridge C. Further, a part of the light-emitting-side light transmitting member 1102 enters the inside of the residual toner accommodating container 41 through the first opening 47, and the light-emitting-side emergent surface 1102*b* is provided inside the residual toner accommodating container 41. Accordingly, the detection light 1101 incident from the light-emitting-side incident surface 1102*a* provided outside the residual toner accommodating container 41 passes through the light-emitting-side light transmitting member 1102 and emerges from the light-emitting-side emergent surface 1102*b* on the inside of the residual toner accommodating container 41.

The light-receiving-side light transmitting member 1103 includes the light-receiving-side incident surface 1103*b* and a light-receiving-side emergent surface 1103*a*. The light-receiving-side incident surface 1103*b* is such that the detection light 1101 emerged from the light-emitting-side emergent surface 1102*b* provided inside the residual toner accommodating container 41 is capable of incident on the light-receiving-side incident surface 1103*b*. The light-receiving-side incident surface 1103*b* is disposed so as to oppose the light-emitting-side emergent surface 1102*b* with a predetermined gap. The light-receiving-side light transmitting member 1103 guides the detection light 1101 incident from the light-receiving-side incident surface 1103*b* to the outside of the residual toner accommodating container 41. The light-receiving-side emergent surface 1103*b* is provided outside the residual toner accommodating container 41 and is capable of emerging the detection light 1101, guided by the light-receiving-side light transmitting member 1103, toward the light emitting element.

The light-receiving-side light transmitting member 1103 is provided so as to extend to the second opening 48 in a direction from the rear end portion 304 to the front end portion 303 of the toner cartridge C. Further, a part of the light-receiving-side light transmitting member 1103 enters the inside of the residual toner accommodating container 41 through the second opening 48, and the light-receiving-side incident surface 1103*b* is provided inside the residual toner accommodating container 41. Accordingly, the detection light 1101 emerged from the light-receiving-side incident surface 1103*b* inside the residual toner accommodating container 41 passes through the predetermined gap and incident on the light-receiving-side incident surface 1103*b*. Then, the detection light 1101 incident on the light-receiving-side incident surface 1103*b* passes through the light-receiving-side light transmitting member 1103 and is emerged from the light-receiving-side emergent surface 1103*a* provided outside the residual toner accommodating container 41.

As shown in part (b) of FIG. 14, the light-emitting-side emergent surface 1102*b* and the light-receiving-side incident surface 1103*b* are disposed in positions opposing each other, and an optical path 1104 along which the detection light 1101 passes through therebetween is formed. By a length of a time in which this optical path 1104 is blocked by the toner, a full state of the toner (amount) in the residual toner accommodating portion 40*a* is detected. However, in the case where the optical path is formed in consideration of light refraction generating during light irradiation from the light-emitting-side emergent surface 1102*b* and during light incidence on the light-receiving-side incident surface 1103*b*, the constitution is not limited to a constitution in which the light-emitting-side emergent surface 1102*b* and the light-receiving-side incident surface 1103*b* are disposed opposed to each other.

[Residual Toner Feeding Constitution in Residual Toner Accommodating Unit 40]

FIG. 15 is a perspective view showing a schematic constitution of the residual toner accommodating unit 40. Incidentally, for explanation, the residual toner accommodating cover 41*b* is not shown. FIG. 17 is a sectional view showing the schematic constitution of the residual toner accommodating unit 40. For explanation, the light transmitting portion 1100 is shown in a transmissive state.

As shown in FIG. 15, in the residual toner accommodating unit 40, a partition member 46 and a first residual toner accommodating screw 44 and a second residual toner feeding screw 45 which are as a residual toner feeding member for feeding the residual toner in the residual toner accommodating portion 40*a*. The partition member 46 partitions the residual toner accommodating portion 40*a* in the residual toner accommodating unit 40 into three portions consisting of a first residual toner accommodating portion 40*a*1, a second residual toner accommodating portion 40*a*2, and a third accommodating portion 40*a*3.

The first residual toner accommodating screw 44 is disposed as to extend between the inside of the first residual toner accommodating portion 40*a*1 and the second residual toner accommodating portion 40*a*2 and feeds the residual toner, accommodated in the first residual toner accommodating portion 40*a*1, in an axis 44*a* direction substantially parallel to the rotational axis 11*b* of the photosensitive drum 11. The second residual toner accommodating screw 45 receives drive from the first residual toner accommodating screw 44 and feeds the residual toner, fed by the first residual toner accommodating screw 44, in an axis direction which is an obliquely upward direction (see FIG. 12). By this, the residual toner is fed from the second residual toner accommodating portion toward the third residual toner accommodating portion 40*a*3.

As shown in FIG. 17, when an amount of the residual toner accommodated in the third residual toner accommodating portion 40*a*3 exceeds a certain amount, the residual toner drops into the first residual toner accommodating portion 40*a*1 through a gap 1105 provided between the residual toner accommodating cover 41*b* and the partition member 46. The dropped residual toner is fed again toward the third residual toner accommodating portion similarly as in the case of the residual toner received through the residual toner receiving opening 42. This flow of the residual toner is repeated, and when the third residual toner accommodating portion 40*a*3 becomes a full state, the residual toner overflowing from the inside of the third residual toner accommodating portion 40*a*3 starts to accumulate inside the first residual toner accommodating portion 40*a*1. Then, when the amount of the residual toner in the first residual toner accommodating portion 40*a*1 exceeds a certain amount, the residual toner blocks the above-described optical path 1104 (see part 8*b*) of FIG. 14). By this, it is possible to detect that the toner in the residual toner accommodating portion 40*a* is in a full state.

Thus, the light-emitting-side emergent surface 1102*b* and the light-receiving-side incident surface 1103*b* are disposed inside the first residual toner accommodating portion 40*a*1. Further, the residual toner receiving opening 42 is provided in a position overlapping with the first residual toner accommodating portion 40*a*1, and the residual toner received through the residual toner receiving opening 42 is accommodated in the first residual toner accommodating portion 40*a*1. That is, in this embodiment, the light-emitting-side emergent surface 1102*b* and the light-receiving-side incident surface 1103*b* are disposed in the neighborhood of the residual toner receiving opening 42. Further, the light-emitting-side incident surface 1102*a* and the light-receiving-side emergent surface 1103*a* are disposed in positions overlapping with the third residual toner accommodating portion 40*a*3 as viewed in the axial direction E.

[Mounting and Demounting Method of Process Cartridge B and Toner Cartridge C]

Then, a mounting and demounting method of the process cartridge B and the toner cartridge C into the apparatus main assembly A will be described using parts (a) and (b) of FIG. 18 and parts (a) to (c) of FIG. 19. As shown in part (a) of FIG. 18, an inside space of the apparatus main assembly A is a mounting portion for the process cartridge B and the toner cartridge C. The openable door 107 is provided so as to be rotatable in an arrow R5 direction about a rotational axis 107*a* relative to the apparatus main assembly A (see parts (a) to (c) of FIG. 19). Part (a) of FIG. 18 is a schematic view showing a state in which the openable door 107 is open.

Further, the apparatus main assembly A includes guiding portions 108 and 109. The guiding portions 108 and 109 are provided along an axial direction D, which is a mounting direction of the process cartridge B and the toner cartridge C, on opposite sides, respectively, with respect to the axial direction E of the process cartridge B and the toner cartridge C in a mounted state. The process cartridge B is, as shown in FIG. 6, provided with upper bosses 93 and 94 and lower bosses 95 and 96 on opposite sides, respectively, with respect to the axial direction E.

The mounting of the process cartridge B and the toner cartridge C into the apparatus main assembly A is performed from the process cartridge B. First, when the process cartridge B is mounted into the apparatus main assembly A, as shown in part (a) of FIG. 18 and part (a) of FIG. 19, the process cartridge B is mounted into the apparatus main assembly A along the axial direction D so that the guiding portion 108 is sandwiched between the upper boss 93 and the lower boss 95 and so that the guiding portion 109 is sandwiched between the upper boss 94 and the lower boss 96. The axial direction D which is the mounting direction is a direction perpendicular to the above-described axial direction E (longitudinal direction). Thus, the process cartridge B is inserted while sandwiching the guiding portions 108 and 109 by the upper bosses 93 and 94 and the lower bosses 95 and 96, so that the process cartridge B is guided to the mounting portion inside the apparatus main assembly A by the guiding portions 108 and 109.

The toner cartridge C is provided with positioning bosses 50*a* and 60*a* on a front side (upstream side) with respect to the mounting direction and on opposite sides with respect to the axial direction E. Further, the toner cartridge C is provided with portions-to-be-guided 50*b* and 60*b* on a rear side (downstream side) with respect to the mounting direction than the positioning bosses 50*a* and are and on opposite sides with respect to the axial direction E. The positioning boss 50*a* and the portion-to-be-guided 50*b* are provided on an outside end surface of a driving-side toner cartridge side cover 50 with respect to the axial direction E. The positioning boss 60*a* and the portion-to-be-guided 60*b* are provided on an outside end surface of a non-driving-side toner cartridge side cover 60 with respect to the axial direction E. The process cartridge B is provided with toner cartridge positioning portions 21*a* and 21*b* on the stay 21 as shown in parts (a) and (b) of FIG. 6.

As shown in part (b) of FIG. 18 and part (b) of FIG. 19, when the toner cartridge C is mounted into the apparatus main assembly A, the portions-to-be-guided 50*b* and 60*b* are placed on the guiding portions 108 and 109, respectively, and are mounted in the axial direction D. As shown in part (c) of FIG. 19, when the toner cartridge C is mounted to a mounting completion position, the positioning bosses 50*a* and 60*a* of the toner cartridge C enter the positioning portions 21*a* and 21*b*, respectively, of the process cartridge B. At this time, leading end sides of the portions-to-be-guided 50*b* and 60*b* with respect to the mounting direction are separated from the guiding portions 108 and 109, and trailing ends thereof are in a contact state with the guiding portions 108 and 109. By this, the toner cartridge C is positioned to the process cartridge B. Further, the trailing ends of the portions-to-be-guided 50*b* and 60*b* contact the guiding portions 108 and 109, so that a position of the toner cartridge C in the apparatus main assembly A is determined.

When the openable door 107 is closed after the process cartridge B and the toner cartridge C are mounted, the image forming apparatus 200 is in a state in which the image is capable of being formed. When the toner cartridge C and the process cartridge B are demounted, a procedure reveres to the above-described procedure is performed.

[Relationship Between Toner Process Discharge Opening, Toner Receiving Opening, and Light Transmitting Portion]

The toner discharge opening 31*a* and the residual toner receiving opening 42 of the toner cartridge C are portion where the toner is delivered boss the toner cartridge C and the process cartridge B which is a separate frame. For example, when the process cartridge B and the toner cartridge C are mounted into the apparatus main assembly A, the toner discharge opening 31*a* is connected to the supply opening 21*c* (FIG. 5) of the process cartridge B, and the residual toner receiving opening 42 is connected to the residual toner discharge opening 72 (FIG. 4) of the process cartridge B. On the other hand, when the process cartridge B and the toner cartridge C are demounted from the apparatus main assembly A, the toner discharge opening 31*a* is separated from the supply opening 21*c* of the process cartridge B, and the residual toner receiving opening 42 is separated from the residual toner discharge opening 72 of the process cartridge B.

Thus, the toner cartridge C is capable of being mounted to and demounted from the process cartridge B, and therefore, for example, when the toner cartridge C is demounted from the process cartridge B, there is a liability that toner leakage from the toner discharge opening 31*a* or the residual toner receiving opening 42 occurs. On the other hand, the light-emitting-side incident surface 1102*a* of the light transmitting portion 1100 is exposed to the outside of the toner cartridge C because the light is incident from an external light emitting element. Similarly, the light-receiving-side emergent surface 1103*a* emerges the light toward an external light receiving element, and therefore, is exposed to the outside of the toner cartridge C. Accordingly, as described above, there is a liability that the toner leaked through the toner discharge opening 31*a* or the residual toner receiving opening 42 is deposited on the light-emitting-side incident surface 1102*a* or the light-receiving-side emergent surface 1103*a*.

When a contaminant such as the toner is deposited on the light-emitting-side incident surface 1102*a*, the detection light 1101 irradiated from the light emitting element cannot be sufficiently transmitted to the light-emitting-side emergent surface 1102*b* through the light-emitting-side light transmitting member 1102. Similarly, the light-receiving-side emergent surface 1103*a* cannot sufficiently emerge the detection light 1101 toward the light receiving element when the contaminant such as the toner is deposited thereon. For this reason, when the toner or the like is deposited on the light-emitting-side incident surface 1102*a* or the light-receiving-side emergent surface 1103*a*, there is a liability that detection accuracy of the toner through the light transmitting portion 1100 lowers. That is, the lowering in detection accuracy leads to a lowering in accuracy of full-state detection of the residual toner amount in the residual toner accommodating portion 40*a*.

For this reason, in this embodiment, as in the following, a positional relationship of the toner discharge opening 31*a* and the residual toner receiving opening 42 with the light-emitting-side incident surface 1102*a* and the light-receiving-side emergent surface 1103*a* is defined.

First, as shown in FIGS. 9 and 10 described above, the residual toner accommodating unit 40 is disposed on a side closer to the right end portion 302 than to the left end portion 301 of the toner cartridge C with respect to the axial direction E (longitudinal direction). Incidentally, in the following, the horizontal direction (second direction) which is perpendicular to the axial direction E (first direction) and which is viewed in the longitudinal direction in a state in which the toner cartridge C is mounted in the apparatus main assembly A is indicated by H. The horizontal direction H viewed in the longitudinal direction is perpendicular to the longitudinal direction and is inclined with respect to the axial direction D. However, directions of this horizontal direction H on one end side and the other end side are approximately the same directions as directions of the axial direction D on one end side and the other end side, respectively. Further, a direction crossing the axial direction E and the horizontal direction is a third direction. In this embodiment, the third direction is a vertical direction V perpendicular to the axial direction E and the horizontal direction H.

The toner discharge opening 31*a* is positioned on a side closer to the left end portion 301 than to the right end portion 302 of the toner cartridge C with respect to the axial direction E. That is, the toner discharge opening 31*a* is positioned near an end portion of the toner supplying unit 30 on a side opposite from the residual toner accommodating unit 40 with respect to the axial direction E. Further, the toner discharge opening 31*a* is positioned in a position closer to the front end portion 303 than to the near end portion 304 of the toner cartridge C with respect to the horizontal direction H perpendicular to the axial direction E. In this embodiment, the toner discharge opening 31*a* is positioned at an end portion of the toner cartridge C on a downstream side with respect to the mounting direction. The toner discharge opening 31*a* is open toward the axial direction E as shown by a center line 31*b*, and is open toward the right end side in this embodiment.

The residual toner receiving opening 42 is positioned in a position closer to the front end portion 303 than to the rear end portion 304 of the toner cartridge C with respect to the horizontal direction H perpendicular to the axial direction E. In this embodiment, the residual toner receiving opening 42 is positioned at an end portion on a downstream side with respect to the mounting direction. Further, the residual toner receiving opening 42 is positioned in a position closer to the right end portion 302 than to the left end portion 301 of the toner cartridge C with respect to the axial direction E. The residual toner receiving opening 42 is open in a direction crossing the axial direction E as shown by a center line 42*a*, and in this embodiment, opens in a direction perpendicular to each of the axial direction E and the axial direction D and opens upward.

The light-emitting-side incident surface 1102*a* and the light-receiving-side emergent surface 1103*a* are provided in positions closer to the right end portion 302 than to the left end portion 301 of the toner cartridge C with respect to the axial direction E and are exposed to the outside. That is, the light-emitting-side incident surface 1102*a* and the light-receiving-side emergent surface 1103*a* are disposed near the end portion of the residual toner accommodating unit 40 on a side opposite from the toner supplying unit 30 with respect to the axial direction E. In this embodiment, the light-emitting-side incident surface 1102*a* and the light-receiving-side emergent surface 1103*a* are provided on a side surface of the toner cartridge C on the right end portion 302 side with respect to the axial direction E. The light-emitting-side incident surface 1102*a* and the light-receiving-side emergent surface 1103*a* are, as described above, exposed to the outside the toner cartridge C through the openings 61 and 62 provided in the non-driving-side toner cartridge side cover 60. Further, the light-emitting-side incident surface 1102*a* and the light-receiving-side emergent surface 1103*a* are directed in the axial direction E, and in this embodiment, are directed toward the right end side. For this reason, each of a light incident direction on the light-emitting-side incident surface 1102*a* and a light emergent direction from the light-receiving-side emergent surface 1103*a* is a direction along the axial direction E.

Further, the light-emitting-side incident surface 1102*a* and the light-receiving-side emergent surface 1103*a* are positioned in positions closer to the rear end portion 304 than to the front end portion 303 of the toner cartridge C with respect to the horizontal direction H. In this embodiment, the light-emitting-side incident surface 1102*a* and the light-receiving-side emergent surface 1103*a* are positioned at an end portion of the toner cartridge C on an upstream side with respect to the mounting direction. Further, the light-emitting-side incident surface 1102*a* and the light-receiving-side emergent surface 1103*a* are provided and arranged in the vertical direction V.

Thus, in this embodiment, positions of the light-emitting-side incident surface 1102*a* and the light-receiving-side emergent surface 1103*a* are defined so that these positions are spaced from the toner discharge opening 31*a* and the residual toner receiving opening 42 with respect to the horizontal direction H. Further, the light-emitting-side incident surface 1102*a* and the light-receiving-side emergent surface 1103*a* are positioned apart from the toner discharge opening 31*a* with respect to the axial direction E.

For this reason, it is possible to suppress that the toner leaked through the toner discharge opening 31*a* or the residual toner receiving opening 42 is deposited on the light-emitting-side incident surface 1102*a* or the light-receiving-side emergent surface 1103*a*.

Further, the toner discharge opening 31*a* and the residual toner receiving opening 42 are positioned on sides downstream of the light-emitting-side incident surface 1102*a* and the light-receiving-side emergent surface 1103*a* with respect to the mounting direction. For this reason, when the mounting and demounting operation of the toner cartridge C is performed, the toner leaked toner the toner discharge opening 31*a* or the residual toner receiving opening 42 is not readily deposited on the light-emitting-side incident surface 1102*a* or the light-receiving-side emergent surface 1103*a*. That is, in the case where the positional relationship between these portions is reversed, for example, when the toner cartridge C is demounted, there is a possibility that the light-emitting-side incident surface 1102*a* and the light-receiving-side emergent surface 1103*a* pass through a position where the toner leaked through the toner discharge opening 31*a* or the residual toner receiving opening 42 suspends, so that the toner is liable to be deposited on the light-emitting-side incident surface 1102*a* or the light-receiving-side emergent surface 1103*a*.

On the other hand, when the toner discharge opening 31*a* and the residual toner receiving opening 42 are positioned on the sides downstream of the light-emitting-side incident surface 1102*a* and the light-receiving-side emergent surface 1103*a* with respect to the mounting direction, for example, when the toner cartridge C is demounted, the light-emitting-side incident surface 1102*a* and the light-receiving-side emergent surface 1103*a* are positioned on sides downstream of the toner discharge opening 31*a* and the residual toner receiving opening 42 with respect to the demounting direction. For this reason, when if the toner is leaked through the toner discharge opening 31*a* or the residual toner receiving opening 42, this toner is not readily deposited on the light-emitting-side incident surface 1102*a* and the light-receiving-side emergent surface 1103*a*.

Thus, in this embodiment, even when the toner is leaked through the toner discharge opening 31*a* or the residual toner receiving opening 42, this toner can be made hard to be deposited on the light-emitting-side incident surface 1102*a* and the light-receiving-side emergent surface 1103*a*. For this reason, a lowering in detection accuracy of the light transmitting portion 1100 due to deposition of the toner and the like can be suppressed, and a lowering in accuracy of full state detection of the residual toner amount in the residual toner accommodating portion 40*a* can be suppressed.

Further, in this embodiment, as described above, the light-emitting-side emergent surface 1102*b* and the light-receiving-side incident surface 1103*b* which are positioned inside the residual toner accommodating container 41 are disposed in the neighborhood of the residual toner receiving opening 42. That is, the light-emitting-side emergent surface 1102*b* and the light-receiving-side incident surface 1103*b* are positioned on the front end portion 303 side of the toner cartridge C, which is a side where the residual toner receiving opening 42 is positioned, with respect to the horizontal direction H. Thus, the light-emitting-side emergent surface 1102*b* and the light-receiving-side incident surface 1103*b* are disposed in the neighborhood of the residual toner receiving opening 42, so that full detection of the residual toner accommodating portion 40*a* can be accurately made as described above. Further, in such a constitution, the light-emitting-side incident surface 1102*a* and the light-receiving-side emergent surface 1103*a* are spaced apart from the residual toner receiving opening 42 with respect to the horizontal direction H as described above, it is possible to compatibly realize that the accuracy in full (state) detection of the residual toner accommodating portion 40*a* is improved and that the toner is not readily deposited on the light-emitting-side incident surface 1102*a* and the light-receiving-side emergent surface 1103*a*.

Incidentally, in this embodiment, the toner discharge opening 31*a* and the residual toner receiving opening 42 are disposed on the downstream side with respect to the mounting direction (axial direction D), and the light-emitting-side incident surface 1102*a* and the light-receiving-side emergent surface 1103*a* are disposed on the upstream side with respect to the mounting direction (axial direction D), but the present invention is not limited to the constitution, and a reverse constitution may also be employed. When the light-emitting-side incident surface 1102*a* and the light-receiving-side emergent surface 1103*a* are spaced from the toner discharge opening 31*a* with respect to the axial direction E and are spaced from the toner discharge opening 31*a* and the residual toner receiving opening 42 with respect to the horizontal direction H, the toner leaked through the toner discharge opening 31*a* or the residual toner receiving opening 42 can be made hard to be deposited on the light-emitting-side incident surface 1102*a* and the light-receiving-side emergent surface 1103*a*.

OTHER EMBODIMENTS

In the above-described embodiment, as the image forming apparatus, the laser printer was described as an example, but the image forming apparatus may also be an LED printer. The image forming apparatus forms an image on a recording medium (for example, sheet materials such as plain paper, a synthetic resin sheet which is a substitute for the plain paper, thick paper, a sheet for an overhead projector, and so on). Accordingly, the image forming apparatus in the present invention includes a copying machine, a printer, a facsimile machine, a multi-function machine having a plurality of functions of these machines While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102276 filed on Jun. 24, 2022, which is hereby incorporated by reference herein in its entirety.

What is claimed is:

1. A toner cartridge comprising:

a toner accommodating unit including a first accommodating portion and a second accommodating portion and configured to accommodate toner, wherein the toner accommodating unit includes a first end portion and a second end portion on a side opposite from the first end portion with respect to a first direction and includes a third end portion and a fourth end portion on a side opposite from the third end portion with respect to a second direction crossing the first direction, wherein the first accommodating portion is on a side closer to the first end portion than to the second end portion in the first direction and the second accommodating portion is on a side closer to the second end portion than to the first end portion in the first direction, wherein the first accommodating portion is provided with a discharge opening for permitting discharge of the toner, accommodated in the first accommodating portion, to outside of the toner cartridge, the discharge opening being positioned closer to the third end portion than to the fourth end portion in the second direction, wherein the second accommodating portion is provided with a receiving opening for receiving the toner from outside of the toner cartridge to the second accommodating portion, the receiving opening being positioned closer to the third end portion than to the fourth end portion in the second direction; and a light transmitting portion having an incident surface and an emergent surface, wherein the incident surface is configured so that light is capable of being incident from outside of the toner cartridge into an inside of the second accommodating portion, wherein the emergent surface is configured so that the light incident into the inside of the second accommodating portion through the incident surface is capable of emerging to outside of the toner cartridge, and wherein the incident surface and the emergent surface are positioned closer to the fourth end portion than to the third end portion in the second direction and are exposed to outside of the cartridge.

2. A toner cartridge according to claim 1, wherein the incident surface and the emergent surface are provided on a side surface of the toner cartridge on a second end portion side with respect to the first direction.

3. A toner cartridge according to claim 2, wherein the incident surface and the emergent surface direct in the first direction.

4. A toner cartridge according to claim 1, wherein the incident surface and the emergent surface are arranged in a third direction crossing the first direction and the second direction.

5. A toner cartridge according to claim 1, wherein the toner accommodating unit includes a frame forming the second accommodating portion, the frame being provided with a first opening and a second opening that communicate with the inside of the second accommodating portion in a portion closer to the third end portion than to the fourth end portion in the second direction, and wherein the light transmitting portion includes a first light transmitting member and a second light transmitting member, the first light transmitting member including the incident surface and extending to the first opening in a direction from the fourth end portion toward the third end portion, and the second light transmitting member including the emergent surface and extending to the second opening in the direction from the fourth end portion toward the third end portion.

6. A toner cartridge according to claim 5, wherein the first opening and the second opening are arranged in the second direction.

7. A toner cartridge according to claim 6, wherein the incident surface and the emergent surface are arranged in a third direction crossing the first direction and the second direction.

8. A toner cartridge according to claim 5, wherein the first opening and the second opening are provided on a side surface of the frame of the second accommodating portion on a second end portion side with respect to the first direction, and wherein the toner cartridge further comprises a cover provided on the side surface of the frame so as to cover the light transmitting portion, the cover being provided with an opening for permitting exposure of the incident surface and the emergent surface to outside of the toner cartridge.

9. The toner cartridge according to claim 1, wherein the receiving opening opens in a direction crossing the first direction.

10. A toner cartridge according to claim 1, wherein the discharge opening opens in a direction crossing the first direction.

11. A toner cartridge according to claim 1, wherein a pump is provided on a first end portion side of the first accommodating portion with respect to the first direction, the pump being configured to discharge toner in the first accommodating portion to outside of the toner cartridge through the discharge opening by extraction and contraction.

12. A toner cartridge according to claim 1, further comprising:

a stirring member configured to stir toner in the first accommodating portion, wherein the stirring member is rotatable about a rotational axis, as a center, extending in the first direction and is provided in the first accommodating portion; and a driving force receiving member configured to receive a driving force, for driving the stirring member, from outside of the toner cartridge, wherein the driving force receiving member is provided on a side surface of the toner cartridge on a first end portion side.

13. A toner cartridge according to claim 1, further comprising a sealing member configured to seal a filling opening for permitting filling of the toner in the first accommodating portion, wherein the sealing member is provided on a third end portion side of the first accommodating portion with respect to the second direction.

14. A toner cartridge according to claim 1, wherein the toner cartridge is mountable in and demounted from a main assembly of an image forming apparatus, and wherein, in a case that the toner cartridge is directed in a direction when the toner cartridge is mounted in the main assembly, the second direction is a horizontal direction.

* * * * *